(12) United States Patent  (10) Patent No.: US 9,135,182 B2
Hara                      (45) Date of Patent:     Sep. 15, 2015

(54) CENTRAL PROCESSING UNIT AND DRIVING METHOD THEREOF

(71) Applicant: Semiconductor Energy Laboratory Co., Ltd., Atsugi-shi, Kanagawa-ken (JP)

(72) Inventor: Yutaka Hara, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 281 days.

(21) Appl. No.: 13/904,745

(22) Filed: May 29, 2013

(65) Prior Publication Data

US 2013/0326157 A1   Dec. 5, 2013

(30) Foreign Application Priority Data

Jun. 1, 2012  (JP) .................................. 2012-126064

(51) Int. Cl.
*G06F 12/08* (2006.01)
*G06F 1/32* (2006.01)

(52) U.S. Cl.
CPC .......... *G06F 12/0891* (2013.01); *G06F 1/3243* (2013.01); *G06F 1/3287* (2013.01); *G06F 12/0893* (2013.01); *G06F 2212/1028* (2013.01); *G06F 2212/222* (2013.01);
(Continued)

(58) Field of Classification Search
CPC ............ Y02B 60/1225; G06F 12/0808; G06F 12/0895; G06F 12/0831; G06F 22/1028; G06F 2212/222; G06F 1/3225; G06F 1/3243; G06F 1/3287
See application file for complete search history.

(56) References Cited

U.S. PATENT DOCUMENTS 3,775,693 A   11/1973  Proebsting
4,800,303 A    1/1989  Graham et al.
(Continued)

FOREIGN PATENT DOCUMENTS

EP   0 404 061 A2   12/1990
EP   1 737 044 A1   12/2006
(Continued)

OTHER PUBLICATIONS

Toshio Kamiya et al.; "Carrier Transport Properties and Electronic Structures of Amorphous Oxide Semiconductors: The present status"; Solid State Physics; Sep. 1, 2009; pp. 621-633; vol. 44, No. 9; Agne Gijutsu Center, with English translation.

(Continued)

*Primary Examiner* — Jared Rutz
*Assistant Examiner* — Khoa Doan
(74) *Attorney, Agent, or Firm* — Fish & Richardson P.C.

(57) ABSTRACT

A cache memory provided in the central processing unit is configured to include a data field which stores data in a main memory unit, a tag field which stores management information on data stored in the data field, and a valid bit which stores information about whether the data stored in the data field and the management information stored in the tag field are valid or invalid. Nonvolatile memory cells are used as memory cells which are components of the data field, the tag field, and the valid bit. Further, a power controller is provided for the central processing unit, and the power controller is configured to selectively supply power supply voltage to the data field, the tag field, and the valid bit when the cache memory is accessed from an arithmetic unit provided in the central processing unit.

14 Claims, 9 Drawing Sheets

(52) U.S. Cl.
CPC .......... *Y02B 60/1225* (2013.01); *Y02B 60/1239* (2013.01); *Y02B 60/1282* (2013.01)

(56) References Cited

U.S. PATENT DOCUMENTS

| | | | |
|---|---|---|---|
| 5,039,883 A | 8/1991 | On | |
| 5,210,845 A * | 5/1993 | Crawford et al. | 711/128 |
| 5,218,607 A | 6/1993 | Saito et al. | |
| 5,528,032 A | 6/1996 | Uchiyama | |
| 5,731,856 A | 3/1998 | Kim et al. | |
| 5,734,914 A | 3/1998 | Nakamura et al. | |
| 5,744,864 A | 4/1998 | Cillessen et al. | |
| 5,761,715 A | 6/1998 | Takahashi | |
| 5,835,934 A * | 11/1998 | Tran | 711/3 |
| 5,845,309 A | 12/1998 | Shirotori et al. | |
| 5,870,616 A | 2/1999 | Loper et al. | |
| 5,980,092 A | 11/1999 | Merryman et al. | |
| 6,049,883 A | 4/2000 | Tjandrasuwita | |
| 6,078,194 A | 6/2000 | Lee | |
| 6,127,702 A | 10/2000 | Yamazaki et al. | |
| 6,204,695 B1 | 3/2001 | Alfke et al. | |
| 6,281,710 B1 | 8/2001 | Poirier et al. | |
| 6,294,274 B1 | 9/2001 | Kawazoe et al. | |
| 6,479,329 B2 | 11/2002 | Nakajima et al. | |
| 6,563,174 B2 | 5/2003 | Kawasaki et al. | |
| 6,573,754 B2 | 6/2003 | Menczigar et al. | |
| 6,684,298 B1 | 1/2004 | Dwarkadas et al. | |
| 6,727,522 B1 | 4/2004 | Kawasaki et al. | |
| 6,788,567 B2 | 9/2004 | Fujimori | |
| 6,822,478 B2 | 11/2004 | Elappuparackal | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,069,388 B1 | 6/2006 | Greenfield et al. | |
| 7,076,748 B2 | 7/2006 | Kapoor et al. | |
| 7,105,868 B2 | 9/2006 | Nause et al. | |
| 7,211,825 B2 | 5/2007 | Shih et al | |
| 7,257,678 B2 | 8/2007 | Golden et al. | |
| 7,269,780 B2 | 9/2007 | Arima et al. | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,418,553 B2 | 8/2008 | Yoshimi | |
| 7,437,513 B2 * | 10/2008 | Saida et al. | 711/128 |
| 7,443,717 B2 | 10/2008 | Fujita et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,502,887 B2 | 3/2009 | Tanaka et al. | |
| 7,576,582 B2 | 8/2009 | Lee et al. | |
| 7,606,976 B2 * | 10/2009 | Raghuvanshi | 711/118 |
| 7,674,650 B2 | 3/2010 | Akimoto et al. | |
| 7,732,819 B2 | 6/2010 | Akimoto et al. | |
| 7,818,502 B2 | 10/2010 | Kurokawa | |
| 7,882,305 B2 | 2/2011 | Moritoki | |
| 7,882,379 B2 | 2/2011 | Kanakogi | |
| 7,929,332 B2 | 4/2011 | Fujita | |
| 2001/0013796 A1 | 8/2001 | Li et al. | |
| 2001/0046027 A1 | 11/2001 | Tai et al. | |
| 2002/0036529 A1 | 3/2002 | Furusawa et al. | |
| 2002/0049918 A1 * | 4/2002 | Kaxiras et al. | 713/300 |
| 2002/0056838 A1 | 5/2002 | Ogawa | |
| 2002/0132454 A1 | 9/2002 | Ohtsu et al. | |
| 2003/0036529 A1 | 2/2003 | Christianson et al. | |
| 2003/0052730 A1 | 3/2003 | Hoshi et al. | |
| 2003/0129853 A1 | 7/2003 | Nakajima et al. | |
| 2003/0145241 A1 * | 7/2003 | Hu et al. | 713/320 |
| 2003/0163594 A1 * | 8/2003 | Aasheim et al. | 709/310 |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0105302 A1 | 6/2004 | Fujimori | |
| 2004/0127038 A1 | 7/2004 | Carcia et al. | |
| 2004/0184340 A1 | 9/2004 | Dwarkadas et al. | |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0038582 A1 | 2/2006 | Peeters | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0119394 A1 | 6/2006 | Dronavalli | |
| 2006/0169973 A1 | 8/2006 | Isa et al. | |
| 2006/0170111 A1 | 8/2006 | Isa et al. | |
| 2006/0179222 A1 * | 8/2006 | Chung et al. | 711/122 |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0011406 A1 * | 1/2007 | Takase et al. | 711/128 |
| 2007/0024187 A1 | 2/2007 | Shin et al. | |
| 2007/0024318 A1 | 2/2007 | Mamidipaka | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0161165 A1 | 7/2007 | Liu et al. | |
| 2007/0172591 A1 | 7/2007 | Seo et al. | |
| 2007/0186057 A1 * | 8/2007 | Moll et al. | 711/146 |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0206959 A1 | 8/2008 | Takayama et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2008/0315286 A1 | 12/2008 | Ieda | |
| 2009/0003051 A1 * | 1/2009 | Fujita | 365/174 |
| 2009/0027083 A1 | 1/2009 | Kimura et al. | |
| 2009/0045397 A1 | 2/2009 | Iwasaki | |
| 2009/0068773 A1 | 3/2009 | Lai et al. | |
| 2009/0073325 A1 | 3/2009 | Kuwabara et al. | |
| 2009/0077319 A1 | 3/2009 | Kurokawa | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0256784 A1 | 10/2009 | Ahn | |

(56) References Cited

U.S. PATENT DOCUMENTS

| | | | |
|---|---|---|---|
| 2009/0278122 A1 | 11/2009 | Hosono et al. | |
| 2009/0280600 A1 | 11/2009 | Hosono et al. | |
| 2009/0310734 A1 | 12/2009 | Umezaki | |
| 2010/0049912 A1* | 2/2010 | Mylavarapu | 711/108 |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2010/0148171 A1 | 6/2010 | Hayashi et al. | |
| 2010/0211744 A1* | 8/2010 | Morrow et al. | 711/128 |
| 2010/0275044 A1* | 10/2010 | Balakrishnan et al. | 713/320 |
| 2011/0010493 A1 | 1/2011 | Kimura et al. | |
| 2011/0060880 A1* | 3/2011 | Hosoda | 711/124 |
| 2011/0062992 A1 | 3/2011 | Okazaki et al. | |
| 2011/0069047 A1 | 3/2011 | Koyama et al. | |
| 2011/0084731 A1 | 4/2011 | Kawae | |
| 2011/0089975 A1 | 4/2011 | Yamazaki et al. | |
| 2011/0090184 A1 | 4/2011 | Yamazaki et al. | |
| 2011/0101332 A1 | 5/2011 | Yamazaki et al. | |
| 2011/0101351 A1 | 5/2011 | Yamazaki | |
| 2011/0102018 A1 | 5/2011 | Shionoiri et al. | |
| 2011/0121878 A1 | 5/2011 | Kato et al. | |
| 2011/0122670 A1 | 5/2011 | Yamazaki et al. | |
| 2011/0128777 A1 | 6/2011 | Yamazaki et al. | |
| 2011/0134683 A1 | 6/2011 | Yamazaki et al. | |
| 2011/0148463 A1 | 6/2011 | Kato et al. | |
| 2011/0156025 A1 | 6/2011 | Shionoiri et al. | |
| 2011/0156027 A1 | 6/2011 | Yamazaki et al. | |
| 2011/0161588 A1* | 6/2011 | Guthrie et al. | 711/122 |
| 2011/0176357 A1 | 7/2011 | Koyama et al. | |
| 2011/0187410 A1 | 8/2011 | Kato et al. | |
| 2011/0228602 A1* | 9/2011 | Saito et al. | 365/185.08 |
| 2011/0284838 A1 | 11/2011 | Saito | |
| 2011/0285372 A1 | 11/2011 | Takahashi et al. | |
| 2011/0285426 A1 | 11/2011 | Takahashi et al. | |
| 2011/0285442 A1 | 11/2011 | Saito | |
| 2012/0032785 A1* | 2/2012 | Kamata | 340/10.1 |
| 2012/0051118 A1 | 3/2012 | Yamazaki et al. | |
| 2012/0057396 A1 | 3/2012 | Yamazaki et al. | |
| 2012/0163071 A1* | 6/2012 | Kurokawa | 365/174 |
| 2012/0287702 A1* | 11/2012 | Fujita | 365/149 |
| 2012/0314512 A1 | 12/2012 | Kurokawa | |
| 2013/0138892 A1* | 5/2013 | Loh et al. | 711/134 |
| 2013/0297889 A1* | 11/2013 | Fujita | 711/144 |

FOREIGN PATENT DOCUMENTS

| | | |
|---|---|---|
| EP | 2 226 847 A2 | 9/2010 |
| JP | 58-205226 A | 11/1983 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 06-275697 A | 9/1994 |
| JP | 08-264794 A | 10/1996 |
| JP | 10-078836 A | 3/1998 |
| JP | 11-505377 A | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2008-276646 A | 11/2008 |
| WO | 2004/114391 A1 | 12/2004 |

OTHER PUBLICATIONS

Tomoyuki Ishii et al.; "A Poly-Silicon TFT With a Sub-5-nm Thick Channel for Low-Power Gain Cell Memory in Mobile Applications"; IEEE Transactions on Electron Devices; Nov. 1, 2004; pp. 1805-1810; vol. 51, No. 11.

Wonchan Kim et al.; "An Experimental High-Density DRAM Cell with a Built-in Gain Stage"; IEEE Journal of Solid-State Circuits; Aug. 1, 1994; pp. 978-981; vol. 29, No. 8.

Shoji Shukuri et al.; "A Complementary Gain Cell Technology for Sub-1V Supply DRAMs"; IEDM 92: Technical Digest of International Electron Devices Meeting; Dec. 13, 1992; pp. 1006-1008.

Shoji Shukuri et al.; "A Semi-Static Complementary Gain Cell Technology for Sub-1 V Supply DRAM's"; IEEE Transactions on Electron Devices; Jun. 1, 1994; pp. 926-931.

Sanghun Jeon et al.; "180nm Gate Length Amorphous InGaZnO Thin Film Transistor for High Density Image Sensor Applications"; IEDM 10: Technical Digest of International Electron Devices Meeting; Dec. 6, 2010; pp. 504-507.

Rhyne; "Fundamentals of Digital Systems Design"; pp. 70-71; 1973; N.J.

Hojung Kim et al.; "Three-Dimensional Integration Approach to High-Density Memory Devices"; IEEE Transactions on Electron Devices; 2011; pp. 3820-3828; vol. 58, No. 11.

David Patterson et al.; "Cache Performance"; 1996, pp. 384-386; Computer Architecture a Quantitative Approach, 2nd Edition; Morgan Kaufmnn Publishers, Inc.

John Hennessy et al.; "Cache Performance Review"; 2003; pp. 393-395; Computer Architecture a Quantitative Approach, Third Edition; Morgan Kaufmnn Publishers.

Shoji Shukuri et al.; "A Semi-Static Complementary Gain Cell Technology for Sub-1 V Supply DRAM's"; IEEE Transactions on Electron Devices, Jun. 1, 1994, vol. 41, No. 6, pp. 926-931.

Ohara, H et al., "Amorphous In—Ga—Zn—Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.

Orita, M et al., "Amorphous transparent conductive oxide InGaO3(ZnO)m (m<4):a Zn4s conductor," Philosophical Magazine, 2001, vol. 81, No. 5, pp. 501-515.

Orita, M et al., "Mechanism of Electrical Conductivity of Transparent InGaZnO4," Phys. Rev. B (Physical Review. B), Jan. 15, 2000, vol. 61, No. 3, pp. 1811-1816.

Osada, T et al., "15.2: Development of Driver-Integrated Panel using Amorphous In—Ga—Zn—Oxide TFT," SID Digest '09 : SID International Symposium Digest of Technical Papers, May 31, 2009, pp. 184-187.

Osada, T et al., "Development of Driver-Integrated Panel Using Amorphous In—Ga—Zn—Oxide TFT," AM-FPD '09 Digest of Technical Papers, Jul. 1, 2009, pp. 33-36.

Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.

Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.

Park, J et al., "Electronic Transport Properties of Amorphous Indium—Gallium—Zinc Oxide Semiconductor Upon Exposure to Water," Appl. Phys. Lett. (Applied Physics Letters), 2008, vol. 92, pp. 072104-1-072104-3.

Park, J et al., "High performance amorphous oxide thin film transistors with self-aligned top-gate structure," IEDM 09: Technical Digest of International Electron Devices Meeting, Dec. 7, 2009, pp. 191-194.

Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.

Park, J et al., "Amorphous Indium—Gallium—Zinc Oxide TFTs and Their Application for Large Size AMOLED," AM-FPD '08 Digest of Technical Papers, Jul. 2, 2008, pp. 275-278.

Park, S et al., "Challenge to Future Displays: Transparent AM-OLED Driven by Peald Grown ZnO TFT," IMID '07 Digest, 2007, pp. 1249-1252.

(56) References Cited

OTHER PUBLICATIONS

Prins, M et al., "A Ferroelectric Transparent Thin-Film Transistor," Appl. Phys. Lett. (Applied Physics Letters), Jun. 17, 1996, vol. 68, No. 25, pp. 3650-3652.

Sakata, J et al., "Development of 4.0-In. AMOLED Display With Driver Circuit Using Amorphous In—Ga—Zn—Oxide TFTs," IDW '09 : Proceedings of the 16th International Display Workshops, 2009, pp. 689-692.

Son, K et al., "42.4L: Late-News Paper: 4 Inch QVGA AMOLED Driven by the Threshold Voltage Controlled Amorphous GIZO (Ga2O3—In2O3—ZnO) TFT," SID Digest '08 : SID International Symposium Digest of Technical Papers, May 20, 2008, vol. 39, pp. 633-636.

Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.

Tsuda, K et al., "Ultra Low Power Consumption Technologies for Mobile TFT-LCDs," IDW '02 : Proceedings of the 9th International Display Workshops, Dec. 4, 2002, pp. 295-298.

Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.

Van De Walle, C, "Hydrogen as a Cause of Doping in Zinc Oxide," Phys. Rev. Lett. (Physical Review Letters), Jul. 31, 2000, vol. 85, No. 5, pp. 1012-1015.

Asakuma, N et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.

Clark, S et al., "First Principles Methods Using CASTEP," Zeitschrift fur Kristallographie, 2005, vol. 220, pp. 567-570.

Coates. D et al., "Optical Studies of the Amorphous Liquid-Cholesteric Liquid Crystal Transition: The Blue Phase," Physics Letters, Sep. 10, 1973, vol. 45A, No. 2, pp. 115-116.

Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.

Dembo, H et al., "RFCPUs on Glass and Plastic Substrates Fabricated by TFT Transfer Technology," IEDM 05: Technical Digest of International Electron Devices Meeting, Dec. 5, 2005, pp. 1067-1069.

Fortunato, E et al., "Wide-Bandgap High-Mobility ZnO Thin-Film Transistors Produced At Room Temperature," Appl. Phys. Lett. (Applied Physics Letters), Sep. 27, 2004, vol. 85, No. 13, pp. 2541-2543.

Fung, T et al., "2-D Numerical Simulation of High Performance Amorphous In—Ga—Zn—O TFTs for Flat Panel Displays," AM-FPD '08 Digest of Technical Papers, Jul. 2, 2008, pp. 251-252, The Japan Society of Applied Physics.

Godo, H et al., "P-9: Numerical Analysis on Temperature Dependence of Characteristics of Amorphous In—Ga—Zn—Oxide TFT," SID Digest '09 : SID International Symposium Digest of Technical Papers, May 31, 2009, pp. 1110-1112.

Godo, H et al., "Temperature Dependence of Characteristics and Electronic Structure for Amorphous In—Ga—Zn—Oxide TFT," AM-FPD '09 Digest of Technical Papers, Jul. 1, 2009, pp. 41-44.

Hayashi, R et al., "42.1: Invited Paper: Improved Amorphous In—Ga—Z—-O TFTs," SID Digest '08 : SID International Symposium Digest of Technical Papers, May 20, 2008, vol. 39, pp. 621-624.

Hirao, T et al., "Novel Top-Gate Zinc Oxide Thin-Film Transistors (ZnO TFTs) for AMLCDs," Journal of the SID , 2007, vol. 15, No. 1, pp. 17-22.

Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.

Hosono, H "68.3: Invited Paper:Transparent Amorphous Oxide Semiconductors for High Performance TFT," SID Digest '07 : SID International Symposium Digest of Technical Papers, 2007, vol. 38, pp. 1830-1833.

Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.

Ikeda, T et al., "Full-Functional System Liquid Crystal Display Using CG-Silicon Technology," SID Digest '04 : SID International Symposium Digest of Technical Papers, 2004, vol. 35, pp. 860-863.

Janotti, A et al., "Native Point Defects in ZnO," Phys. Rev. B (Physical Review. B), 2007, vol. 76, No. 16, pp. 165202-1-165202-22.

Janotti, A et al., "Oxygen Vacancies in ZnO," Appl. Phys. Lett. (Applied Physics Letters), 2005, vol. 87, pp. 122102-1-122102-3.

Jeong, J et al., "3.1: Distinguished Paper: 12.1-Inch WXGA AMOLED Display Driven by Indium—Gallium—Zinc Oxide TFTs Array," SID Digest '08 : SID International Symposium Digest of Technical Papers, May 20, 2008, vol. 39, No. 1, pp. 1-4.

Jin, D et al., "65.2: Distinguished Paper:World-Largest (6.5") Flexible Full Color Top Emission AMOLED Display on Plastic Film and Its Bending Properties," SID Digest '09 : SID International Symposium Digest of Technical Papers, May 31, 2009, pp. 983-985.

Kanno, H et al., "White Stacked Electrophosphorecent Organic Light-Emitting Devices Employing MoO3 As a Charge-Generation Layer," Adv. Mater. (Advanced Materials), 2006, vol. 18, No. 3, pp. 339-342.

Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.

Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.

Kikuchi, H et al., "Polymer-Stabilized Liquid Crystal Blue Phases," Nature Materials, Sep. 1, 2002, vol. 1, pp. 64-68.

Kim, S et al., "High-Performance oxide thin film transistors passivated by various gas plasmas," The Electrochemical Society, 214th ECS Meeting, 2008, No. 2317, 1 page.

Kimizuka, N et al., "Spinel,YBFE2O4, and YB2FE3O7 Types of Structures for Compounds in the In2O3 and Sc2O3-A2O3-BO Systems [A; Fe, Ga, or Al; B: Mg, Mn, Fe, Ni, Cu,or Zn] At Temperatures Over 1000° C.," Journal of Solid State Chemistry, 1985, vol. 60, pp. 382-384.

Kimizuka, N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System," Journal of Solid State Chemistry, Apr. 1, 1995, vol. 116, No. 1, pp. 170-178.

Kitzerow, H et al., "Observation of Blue Phases in Chiral Networks," Liquid Crystals, 1993, vol. 14, No. 3, pp. 911-916.

Kurokawa, Y et al., "UHF RFCPUs on Flexible and Glass Substrates for Secure RFID Systems," Journal of Solid-State Circuits , 2008, vol. 43, No. 1, pp. 292-299.

Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.

Lee, H et al., "Current Status of, Challenges to, and Perspective View of AM-OLED," IDW '06 : Proceedings of the 13th International Display Workshops, Dec. 7, 2006, pp. 663-666.

Lee, J et al., "World's Largest (15-Inch) XGA AMLCD Panel Using IGZO Oxide TFT," SID Digest '08 : SID International Symposium Digest of Technical Papers, May 20, 2008, vol. 39, pp. 625-628.

(56) References Cited

OTHER PUBLICATIONS

Lee, M et al., "15.4: Excellent Performance of Indium—Oxide-Based Thin-Film Transistors by DC Sputtering," SID Digest '09 : SID International Symposium Digest of Technical Papers, May 31, 2009, pp. 191-193.

Li, C et al "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.

Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.

Meiboom, S et al., "Theory of the Blue Phase of Cholesteric Liquid Crystals," Phys. Rev. Lett. (Physical Review Letters), May 4, 1981, vol. 46, No. 18, pp. 1216-1219.

Miyasaka, M, "Suftla Flexible Microelectronics on Their Way to Business," SID Digest '07 : SID International Symposium Digest of Technical Papers, 2007, vol. 38, pp. 1673-1676.

Mo, Y et al., "Amorphous Oxide TFT Backplanes for Large Size AMOLED Displays," IDW '08 : Proceedings of the 6th International Display Workshops, Dec. 3, 2008, pp. 581-584.

Nakamura, "Synthesis of Homologous Compound with New Long-Period Structure," NIRIM Newsletter, Mar. 1995, vol. 150, pp. 1-4 with English translation.

Nakamura, M et al., "The phase relations in the In2O3—Ga2ZnO4—ZnO system at 1350° C.," Journal of Solid State Chemistry, Aug. 1, 1991, vol. 93, No. 2, pp. 298-315.

Nomura, K et al., "Thin-Film Transistor Fabricated in Single-Crystalline Transparent Oxide Semiconductor," Science, May 23, 2003, vol. 300, No. 5623, pp. 1269-1272.

Nomura, K et al., "Amorphous Oxide Semiconductors for High-Performance Flexible Thin-Film Transistors," Jpn. J. Appl. Phys. (Japanese Journal of Applied Physics) , 2006, vol. 45, No. 5B, pp. 4303-4308.

Nomura, K et al., "Room-Temperature Fabrication of Transparent Flexible Thin-Film Transistors Using Amorphous Oxide Semiconductors," Nature, Nov. 25, 2004, vol. 432, pp. 488-492.

Nomura, K et al., "Carrier transport in transparent oxide semiconductor with intrinsic structural randomness probed using single-crystalline InGaO3(ZnO)5 films," Appl. Phys. Lett. (Applied Physics Letters) , Sep. 13, 2004, vol. 85, No. 11, pp. 1993-1995.

Nowatari, H et al., "60.2: Intermediate Connector With Suppressed Voltage Loss for White Tandem OLEDs," SID Digest '09 : SID International Symposium Digest of Technical Papers, May 31, 2009, vol. 40, pp. 899-902.

Oba, F et al., "Defect energetics in ZnO: A hybrid Hartree-Fock density functional study," Phys. Rev. B (Physical Review. B), 2008, vol. 77, pp. 245202-1-245202-6.

Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.

Ohara, H et al., "21.3: 4.0 In. QVGA AMOLED Display Using In—Ga—Zn—Oxide TFTs With a Novel Passivation Layer," SID Digest '09 : SID International Symposium Digest of Technical Papers, May 31, 2009, pp. 284-287.

\* cited by examiner

CENTRAL PROCESSING UNIT AND DRIVING METHOD THEREOF

BACKGROUND OF THE INVENTION

1. Field of the Invention

The present invention relates to a central processing unit and a driving method thereof.

2. Description of the Related Art

Central processing units (CPUs) have a variety of architectures depending on their usage, and an architecture called a stored-program method is a predominant architecture of CPUs. In a stored-program CPU, an instruction and data needed for carrying out the instruction are stored in a semiconductor memory unit (hereinafter simply referred to as a memory unit), and the instruction and the data are sequentially read from the memory unit, whereby the instruction is carried out.

The memory unit includes, besides a main memory unit for storing data and instructions, a cache memory which can perform data writing and data reading at high speed. In order to reduce access to the low-speed main memory unit and speed up the arithmetic processing, a cache memory is provided in an information processing unit to be located between an arithmetic unit (also referred to as an operation part) or a control unit (also referred to as a control part) of the information processing unit and the main memory unit. In general, a static random access memory (SRAM) or the like is used as a cache memory. For example, Patent Document 1 discloses a structure in which a volatile memory such as an SRAM and a nonvolatile memory are used in combination as a cache memory.

The capacitance of a cache memory provided in a central processing unit increases year after year. Accordingly, the proportion of power consumption of a cache memory to the total consumption of a central processing unit remarkably increases; thus, various methods have been suggested in order to reduce power consumption of the cache memory.

For example, a method in which a cache memory is divided into several blocks and the less frequently used blocks (also referred to as lines) acquired by historical information are operated with a low threshold voltage has been suggested. Further, a method for stopping power supply to a cache line which is less likely to be accessed has also been suggested.

REFERENCE

Patent Document

[Patent Document 1] Japanese Published Patent Application No. 2008-276646

SUMMARY OF THE INVENTION

The idea in the description of the related art is based on the assumption that the cache memory is operated constantly. In that situation, a means for reducing power consumption such that power supply voltage to be supplied is reduced or that power supply itself is stopped is performed for a part (hereinafter also referred to as a selected area) of the cache memory, so that areas other than the selected area consume power constantly.

Therefore, the effect of reducing power consumption of a central processing unit varies depending on the use condition of a cache memory (e.g., a state in which data throughput is increased and there are few selected areas of the cache memory, and the like).

In view of the foregoing technical background, an object of the present invention is to provide a central processing unit with reduced power consumption.

Further, another object of the present invention is to provide a method for driving the central processing unit.

An object of the present invention is a method for reducing power consumption of the central processing unit in which the power consumed in the areas other than the selected area of the cache memory described above is focused and such power is reduced so that power consumption of the central processing unit is reduced.

Specifically, first, the cache memory provided in the central processing unit is configured to include a data field which stores part of data in a main memory unit, a tag field which stores management information on data stored in the data field, and a valid bit which is included in the tag field and which stores information about whether the data stored in the data field and the management information stored in the tag field are valid or invalid. Secondary, nonvolatile memory cells which can store written data even when power is not supplied are used as memory cells which are components of the data field, the tag field, and the valid bit.

Thirdly, the central processing unit is configured to include a power controller, and the power controller is configured to stop supply of power supply voltage to the data field, the tag field, and the valid bit the whole time when the cache memory is not accessed (e.g., the cache memory does not receive requests for reading) from an arithmetic unit provided in the central processing unit, and configured to selectively supply power supply voltage to the data field, the tag field, and the valid bit when the cache memory is accessed.

Note that "power supply voltage is supplied to a data field" can also be expressed that "power supply voltage is supplied to a memory cell that is a component of a data field". The same applied to a tag field and a valid bit.

An idea that power consumption of the central processing unit with the above-described structure can be further reduced as compared with that of a general central processing unit is briefly described with reference to FIGS. 7A and 7B and FIGS. 8A and 8B.

FIGS. 7A and 7B and FIGS. 8A and 8B are diagrams each schematically illustrating operating condition of the central processing unit in a cache memory 702 provided with a plurality of cache lines 714 each including a data field 708, a tag field 710, and a valid bit 712. FIGS. 7A and 7B are diagrams schematically illustrating operating conditions of a general central processing unit. FIGS. 8A and 8B are diagrams schematically illustrating operation conditions of a central processing unit described in this specification and the like. In FIGS. 7A and 7B and FIGS. 8A and 8B, a shaded portion represents that power supply voltage is supplied, and a no shaded portion represents that power supply voltage is not supplied.

A volatile memory cell (e.g. a static random access memory (SRAM)) in which written data is changed when power supply voltage is not supplied is used in each of the data field 708, the tag field 710, and the valid bit 712 which are included in the cache memory 702 shown in FIGS. 7A and 7B. A register, a cache memory, or the like is generally formed using a volatile memory unit in which data is erased when supply of power supply voltage is stopped. Thus, as shown in FIG. 7A, even when the cache memory 702 is not accessed from the outside (e.g., an arithmetic unit), power supply voltage is constantly supplied to the data field 708 (also expressed as a memory cell provided for the data field 708), the tag field 710 (also expressed as a memory cell provided for the tag field 710), and the valid bit 712 (also expressed as a memory cell provided for the valid bit 712) though there are some difference in the amount of power supply voltage.

As a method for reducing power consumption of the cache memory 702, supply of power supply voltage to the cache line 714 which is seldom accessed from the outside of the cache memory 702 (e.g., there are very few reading requests from the arithmetic unit)) is stopped (see FIG. 7B). Note that operation may be performed in which supply of power supply voltage is not completely stopped and minimum power supply voltage that is enough to hold the state of stored data is supplied; however, the fact remains that power is consumed in the cache line 714 in which such operation is not performed.

The cache memory described in this specification and the like corresponds to the general cache memory in that a plurality cache lines each including the data field 708, the tag field 710, and the valid bit 712 exist; however, the cache memory described in this specification and the like is formed using a nonvolatile memory cell in which written data can be stored even when power supply voltage is not supplied to the data field 708, the tag field 710, and the valid bit 712, so that supply of power supply voltage to all the cache lines 714 can be stopped as shown in FIG. 8A when data transmission and reception to/from the outside of the cache memory 702 (e.g., an arithmetic unit and the like) is not performed.

Further, in this specification and the like, a novel structure capable of reducing power consumption is proposed regarding a state of startup (also referred to as a state of power supply) of the cache memory 702 in a case where data transmission and reception from/to the outside of the cache memory 702 is performed. Here, an example of an idea about the state of startup is described with reference to FIG. 8B.

First, power supply voltage is supplied to the valid bit 712 included in the cache memory 702, and which of the cache lines stores valid data is determined (see FIG. 8B, data "1" is considered as valid data in FIG. 8B); then, power supply voltage is supplied only to a tag field in the cache line which is determined that the data is valid.

Using the data stored in the tag field, which of the data fields stores necessary data (e.g., data requested by an arithmetic unit for reading request) is determined and power supply voltage is supplied only to the data field which has determined that the necessary data is stored.

Accordingly, while supply of power supply voltage is suppressed, access to the necessary data can be made, so that power consumption of the central processing unit can be reduced.

In order to supply power supply voltage to only some of the data fields and the tag fields as described above, a structure may be employed in which a power controller is provided between a cache memory and a power unit which supplies power to the central processing unit and the power controller is properly operated using the arithmetic unit provided in the central processing unit.

The arithmetic unit not only controls the operation state of the power controller but also determines the data stored in the cache memory 102 (e.g., the determination as to which of cache lines stores effective data).

That is, one embodiment of the present invention is a central processing unit including a cache memory provided with a plurality of cache lines each including a data field which stores part of data in a main memory unit, a tag field which stores management information on data stored in the data field, and a valid bit which is included in the tag field and which stores information about whether the data stored in the data field and the management information stored in the tag field are valid or invalid; a power controller which determines states of power supply to the data field, the tag field, and the valid bit; and an arithmetic unit which makes a first determination as to whether the data stored in the valid bit is valid or invalid and a second determination as to whether an address of data required is consistent with the data stored in the tag field, and outputs a result of the first determination and a result of the second determination to the power controller. The data field, the tag field, and the valid bit are each formed using a memory cell which stores written data even when power supply voltage is not supplied. When data transmission and reception from the arithmetic unit to the cache memory is not performed, the power controller stops supply of power supply voltage to the data field, the tag field, and the valid bit; and when data transmission and reception from the arithmetic unit to the cache memory is performed, the power controller performs supply of power supply voltage to the valid bit, to the tag field in the cache line which is determined that the data stored in the valid bit is valid by the first determination, and to the data field in the cache line which is determined that the address of the data required is consistent with the data stored in the tag field by the second determination.

The central processing unit has the above-described structure, so that power supply voltage can be supplied to only some of the data fields and the tag fields. Thus, power consumption of the central processing unit can be reduced.

In the above structure, it is preferable that the power controller be configured to stop supply of power supply voltage to the valid bit after the first determination by the arithmetic unit or at the time of the first determination, in which case power consumption of the central processing unit can be further reduced.

Further, in the above structure, it is preferable that the power controller be configured to stop supply of power supply voltage to the tag field after the second determination by the arithmetic unit or at the time of the second determination, in which case power consumption of the central processing unit can be further reduced.

Another embodiment of the present invention is a method for driving a central processing unit including a cache memory provided with a plurality of cache lines each including a data field which stores part of data in a main memory unit, a tag field which stores management information on data stored in the data field, and a valid bit which is included in the tag field and which stores information about whether the data stored in the data field and the management information stored in the tag field are valid or invalid; a power controller which determines states of power supply to the data field, the tag field, and the valid bit; and an arithmetic unit which makes a first determination as to whether the data stored in the valid bit is valid or invalid and a second determination as to whether an address of data required is consistent with data stored in the tag field, and outputs a result of the first determination and a result of the second determination to the power controller. The data field, the tag field, and the valid bit are each formed using a memory cell which stores written data even when power supply voltage is not supplied. The method includes the steps of by the power controller, stopping supply of power supply voltage to the data field, the tag field, and the valid bit when data transmission and reception from the arithmetic unit to the cache memory is not performed. When data stored in the cache memory is read by the arithmetic unit, the following six processing is performed. As first processing, the power controller supplies power supply voltage to the valid bit; as second processing, the arithmetic unit makes the first determination and outputs the result to the power controller; as third processing, the power controller supplies power supply voltage to the tag field in the cache line which is determined to be valid in the second processing; as fourth processing, the arithmetic unit makes the second determination and outputs the result to the power controller; as fifth processing, the power controller supplies power supply voltage to the data field in the cache line which is determined to be consistent in the fourth processing; and as sixth processing, the arithmetic unit reads the data in the data field to which power supply voltage is supplied in the fourth processing.

The central processing unit is operated using the above-described driving method, so that power supply voltage can be selectively supplied to some of the data fields and the tag fields. Thus, power consumption of the central processing unit can be reduced.

In addition to the above-described driving method, by performing either or both of the following: stop of the supply of power supply voltage to the valid bit after the first determination by the arithmetic unit or at the time of the first determination; and stop of the supply of power supply voltage to the tag field after the second determination or at the time of the second determination, power consumption of the central processing unit can be further reduced.

As described in this specification and the like, nonvolatile memory cells are used as memory cells which are components of the data field, the tag field, and the valid bit, and the power controller is configured to stop supply of power supply voltage to the data field, the tag field, and the valid bit the whole time when the cache memory is not accessed from the arithmetic unit, and configured to selectively supply power supply voltage to the data field, the tag field, and the valid bit when the cache memory is accessed. Thus, only when the cache memory is accessed from the arithmetic unit, part of the cache memory is operated so that necessary processing (e.g., data reading from the cache memory to the arithmetic unit) is performed, so that power consumption of the central processing unit can be drastically reduced.

DETAILED DESCRIPTION OF THE INVENTION

Figure 1:
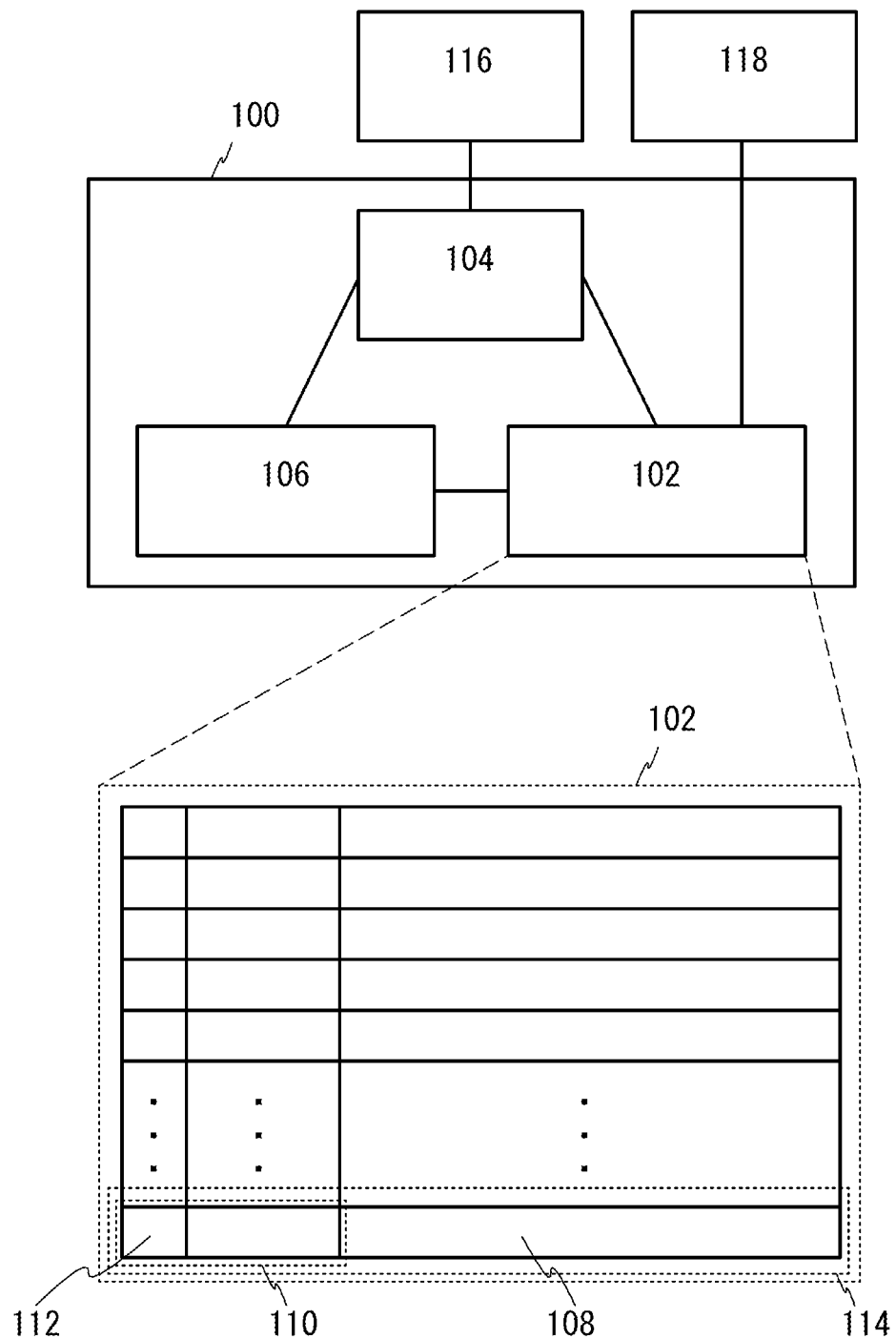
FIG. 1 illustrates a configuration of a central processing unit.

Hereinafter, embodiments of the invention disclosed in this specification will be described with reference to the accompanying drawings. Note that the present invention is not limited to the following description and it will be readily appreciated by those skilled in the art that modes and details can be modified in various ways without departing from the spirit and the scope of the present invention. Therefore, the invention should not be construed as being limited to the description in the following embodiments.

Note that in the following embodiments, the same portions or portions having similar functions are denoted by the same reference numerals in different drawings, and explanation thereof will not be repeated.

Note that the position, size, range, or the like of each component illustrated in drawings and the like is not accurately represented in some cases for easy understanding. Therefore, the disclosed invention is not necessarily limited to the position, size, range, or the like as disclosed in the drawings and the like.

Note that a node in this specification and the like means an element (e.g., a wiring) which enables electric connection between elements included in a circuit. Therefore, a "node to which A is connected" is a wiring which is electrically connected to A and can be regarded as having the same potential as A. Note that even when the one or more elements (e.g., a switch, a transistor, a capacitor, an inductor, a resistor, or a diode) which enable electric connection is/are inserted in the wiring, a portion on the wiring which is connected to a terminal of the element(s) on a side opposite to A can be regarded as the "node to which A is connected" as long as the portion has the same potential as A.

Embodiment 1

In this embodiment, a configuration of a central processing unit is described with reference to FIG. 1 and FIG. 2, and an example of a method for driving the central processing unit is described with reference to FIGS. 3A to 3C.

(Configuration Example of Central Processing Unit)

FIG. 1 illustrates an example of a configuration of a central processing unit described in this specification and the like.

As shown in FIG. 1, a central processing unit 100 includes a cache memory 102, a power controller 104, and an arithmetic unit 106.

The central processing unit 100 is connected to a power unit 116 and a main memory unit 118. Power supply voltage is supplied from the power unit 116 to the cache memory 102 and the arithmetic unit 106 via the power controller 104, and part of data in the main memory unit 118 is stored in the cache memory 102.

The cache memory 102 is provided with a cache line 114 including a data field 108 which stores part of data in the main memory unit 118, a tag field 110 which stores management information on data stored in the data field 108, and a valid bit 112 which is included in the tag field 110 and which stores information about whether data stored in the data field 108 and the tag field 110 is valid or invalid. Note that the data field 108, the tag field 110, and the valid bit 112 are each formed using a nonvolatile memory cell capable of storing written data even when power supply voltage is not supplied from the power unit 116 via the power controller 104. In this specification and the like, the valid bit 112 is included in the tag field 110; however, it is not necessarily included in the tag field 110, and the valid bit 112 and the tag field 110 may be separately provided.

As a nonvolatile memory cell, for example, a flash memory, a magnetoresistive random access memory (MRAM), a ferroelectric random access memory (FeRAM), a resistance random access memory (ReRAM), or the like can be used.

Further, a memory cell with nonvolatile properties can be obtained by the use of a transistor (the transistor is also referred to as an OS transistor in this specification and the like) in which an oxide semiconductor material is used for a semiconductor layer (a region where at least a channel is formed) for a part of a component of a memory cell.

A structure of the memory cell with nonvolatile properties, in which an OS transistor is used for part of the component is described in detail in Embodiment 3.

As described above, the cache memory 102 includes the data field 108, the tag field 110, and the valid bit 112, and the data field 108, the tag field 110, and the valid bit 112 are each formed using a nonvolatile memory cell capable of storing written data even when power supply voltage is not supplied; thus, supply of power supply voltage to all the data field 108, the tag field 110, and the valid bit 112 can be stopped when the cache memory 102 is not accessed from the outside (e.g., the arithmetic unit 106).

The power controller 104 has a function of determining which part of the cache memory 102 is to be supplied with power supply voltage from the power unit 116 and to which part of the cache memory 102 the supply of power supply voltage is to be stopped, based on a signal from the arithmetic unit 106.

A structure of the power controller 104 is not particularly limited as long as the above-described function is included, and a circuit configuration and the like can be decided as appropriate by a practitioner.

Figure 2:
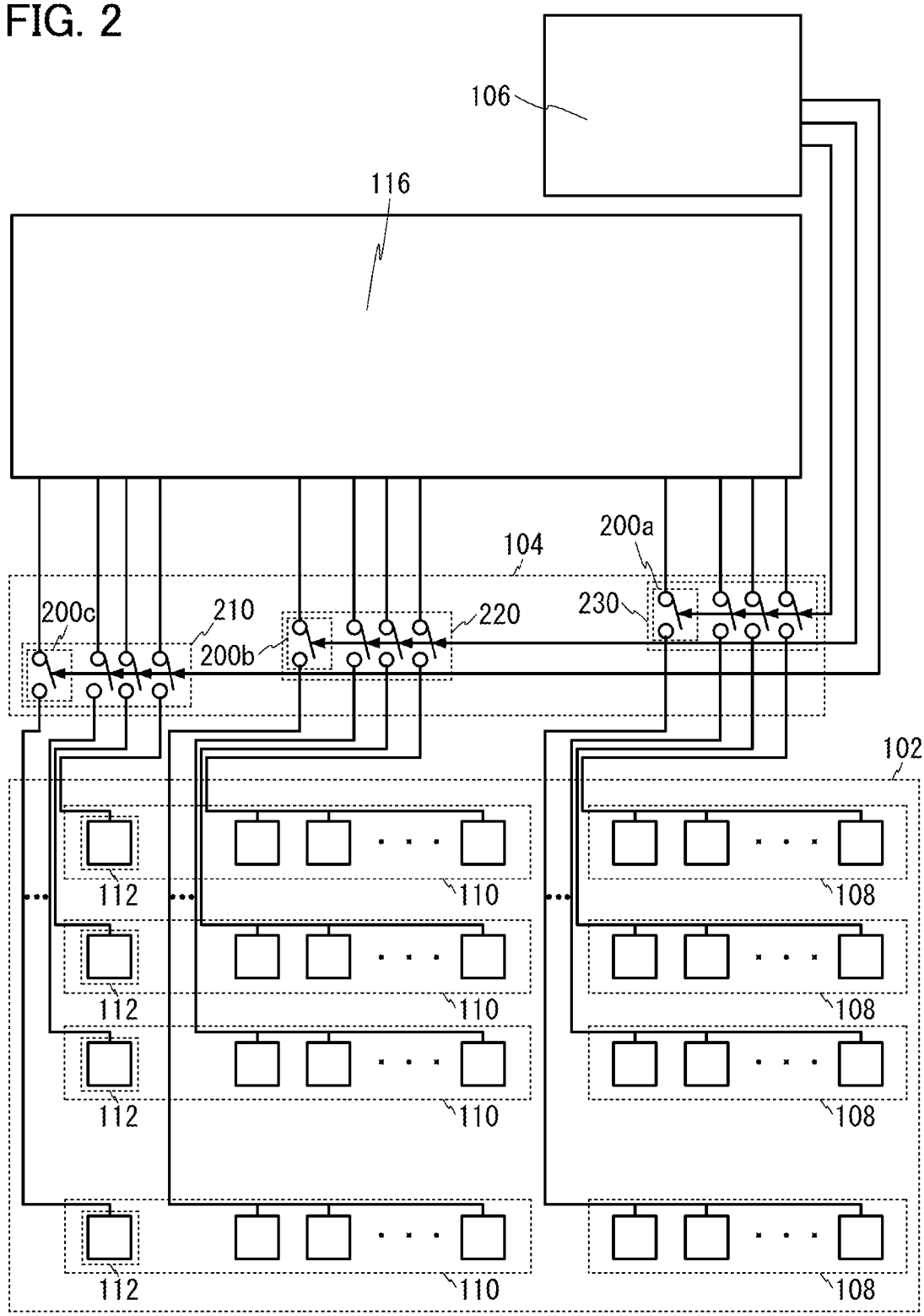
FIG. 2 illustrates an example of a power controller.

For example, as shown in FIG. 2, switch elements 200a capable of selecting on/off state in accordance with an instruction from the arithmetic unit 106 are provided for power lines connected to each of a plurality of memory cells included in the data field 108, switch elements 200b capable of selecting on/off state in accordance with an instruction from the arithmetic unit 106 are provided for power lines connected to each of a plurality of memory cells included in the tag field 110, and switch elements 200c capable of selecting on/off state in accordance with an instruction from the arithmetic unit 106 are provided for power lines connected to each of a plurality of memory cells included in the valid bit 112, so that these switch elements 200a, 200b, and 200c may collectively serve as the power controller 104.

In the circuit configuration in FIG. 2, power supply for all the data field 108, the tag field 110, and the valid bit 112 can be controlled per line; however, power supply for the valid bit 112 is not necessarily controlled per line. For example, power supply for all lines of the valid bit 112 may be performed by the power controller 104 at the same time, or stopped at the same time.

Further, the circuit configuration in FIG. 2 is just one example of the configuration of the power controller 104, and thus the configuration of the power controller 104 is not limited thereto. As described above, it is acceptable as long as the power controller 104 has a function of determining which part of the cache memory 102 is to be supplied with power supply voltage from the power unit 116 and to which part of the cache memory 102 the supply of power supply voltage is to be stopped, based on a signal from the arithmetic unit 106.

As described above, the power controller 104 has a structure in which power supply from the power unit 116 to the data field 108, the tag field 110, and the valid bit 112 can be controlled in accordance with the instruction from the arithmetic unit 106; thus, the central processing unit can access (access so as to obtain or update the information on data or an instruction) to the necessary data while suppressing the amount of power supply voltage to be supplied from the power unit 116 to the cache memory 102, so that power consumption of the central processing unit 100 can be reduced.

The arithmetic unit 106 has functions of determining whether the data stored in the valid bit 112 is valid or invalid (hereinafter referred to as "a first determination") and determining whether management information on data required by the arithmetic unit 106 is consistent with management information on data stored in the tag field 110 (hereinafter referred to as "a second determination") and outputting the results of the first determination and the second determination to the power controller 104.

The above is the description of the configuration of the central processing unit in this embodiment.

(Example of Method for Driving Central Processing Unit)

Next, an example of a method for driving the central processing unit 100 is described with reference to FIGS. 3A to 3C. Note that FIGS. 3A to 3C are diagrams schematically showing how the state of power supply changes in the cache memory 102 by performing the method for driving the central processing unit 100 described in this embodiment.

In the driving method below, description is made on reading operation in which the arithmetic unit 106 reads the data stored in the data field 108 assuming that part of the data in the main memory unit 118 is stored in the data field 108 of the cache memory 102.

Figure 3A:
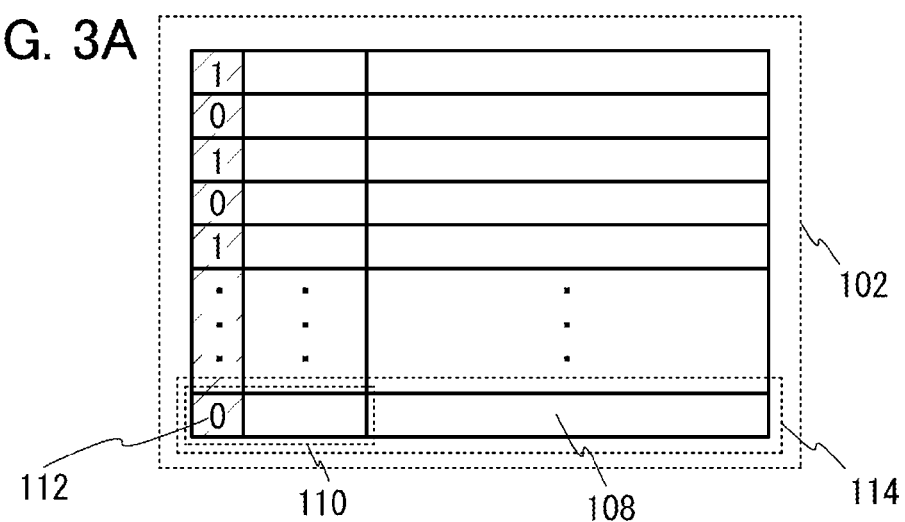
FIGS. 3A to 3C each illustrate an idea of the state of power supply in a cache memory.

First, as first processing, at the time when it is determined that the arithmetic unit 106 starts reading of necessary data, a signal indicating the determination is output from the arithmetic unit 106 to the power controller 104, and the power controller 104 that has been received the signal starts supply of power supply voltage to the valid bits 112 of all lines provided in the cache memory 102 (see FIG. 3A).

In order that power supply voltage is supplied to the valid bits 112 of all lines provided in the cache memory 102 as described above, with reference to FIG. 2, for example, the switch elements in a range 210 (that is, the switch elements 200c provided for power lines connected to the valid bits 112) among the plurality of switch elements in the power controller 104 are turned on.

Accordingly, the data stored in the nonvolatile memory cell of the valid bit 112 of each line can be read out.

Note that hereinafter, data "1" means valid data, and data "0" means invalid data.

Next, as second processing, the arithmetic unit 106 makes the first determination as to whether the data stored in the valid bit 112 of each line is valid (data "1") or invalid (data "0"), and outputs a signal indicating the result of the determination to the power controller 104.

Figure 3B:
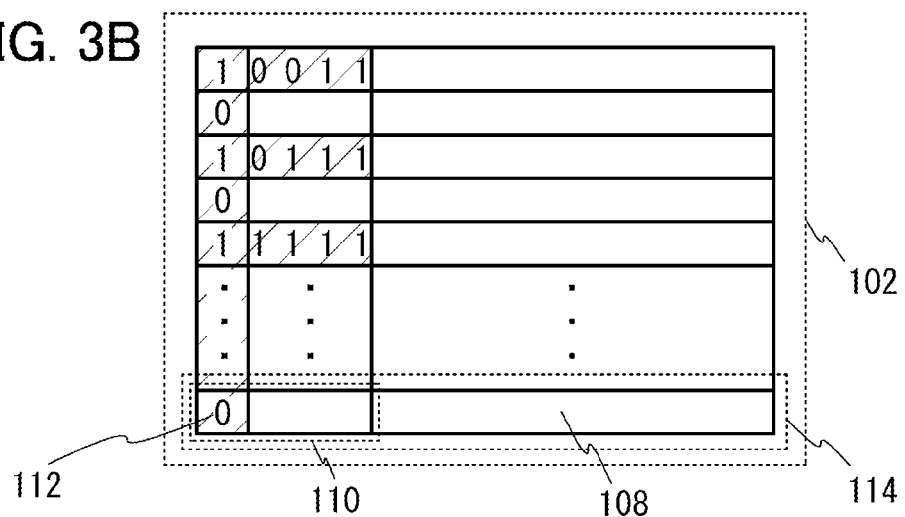

As third processing, the power controller 104 that has received the signal indicating the result of the first determination starts supply of power supply voltage to a tag field 110 in a line where data of the valid bit 112 is valid among a plurality of tag fields 110 provided in the cache memory 102 (see FIG. 3B).

In order to supply power supply voltage to the tag field 110 in a line where data of the valid bit 112 is valid as described above, with reference to FIG. 2, for example, the switch elements 200b connected to the tag field 110 in the line where data of the valid bit 112 is valid among the switch elements in a range 220 are turned on.

Accordingly, the data stored in the nonvolatile memory cell of the tag field 110 where supply of power supply voltage has started can be read out.

As fourth processing, the arithmetic unit 106 compares management information on data necessary for the arithmetic unit 106 (in the description below, the management information is denoted by "1111") and management information on data stored in the tag field 110 to which power supply voltage is supplied, and makes a second determination as to which of the cache lines 114 stores the data necessary for the arithmetic unit 106, and outputs to the power controller 104 a signal indicating which of data fields 108 stores the data necessary for the arithmetic unit 106.

In order to supply power supply voltage to the data field 108 in which the data necessary for the arithmetic unit 106 is stored, with reference to the circuit diagram in FIG. 2, a switch element 200a connected to the data field 108 in which the data necessary for the arithmetic unit 106 is stored among the switch elements in a range 230 is turned on.

Figure 3C:
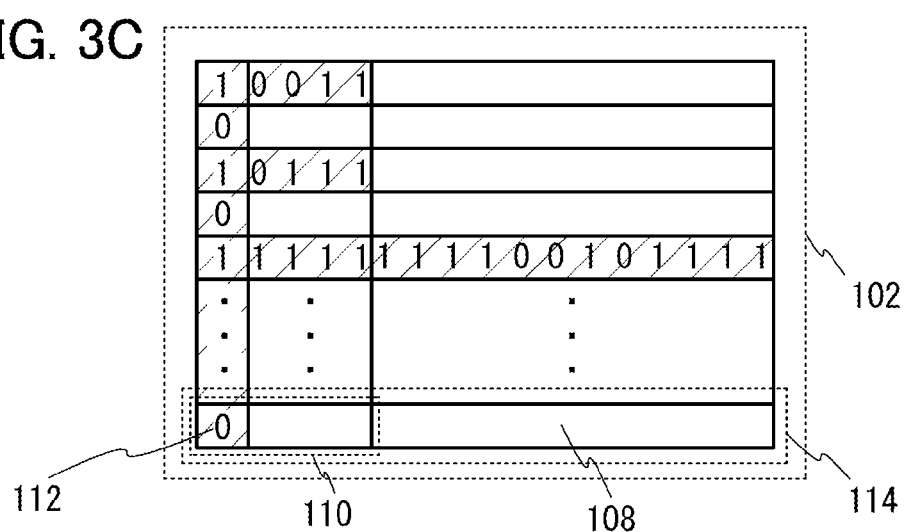

As fifth processing, the power controller 104 that has received the signal indicating the result of the second determination starts supply of power supply voltage to the data field 108 in which the data necessary for the arithmetic unit 106 is stored among a plurality of data fields 108 provided in the cache memory 102 (see FIG. 3C).

Next, as sixth processing, the arithmetic unit 106 reads out the data stored in the data field 108 to which power supply voltage is supplied. After the sixth processing, supply of power supply voltage to the cache memory 102 is stopped. The memory cells in the cache memory 102 is formed using nonvolatile memory cells, so that data can be held even after the supply of power supply voltage is stopped.

The above is the description of the method for driving the central processing unit in this embodiment.

Effect of Embodiment 1

As described above, nonvolatile memory cells are used for the memory cells which are components of the data field 108, the tag field 110, and the valid bit 112; supply of power supply voltage to the data field 108, the tag field 110, and the valid bit 112 is kept stopped when the cache memory 102 is not accessed from the arithmetic unit 106; and power supply voltage is selectively supplied to the data field 108, the tag field 110 and the valid bit 112 using the power controller 104 when the cache memory 102 is accessed. Thus, only when the cache memory 102 is accessed from the arithmetic unit 106, part of the cache memory is operated to perform necessary processing, so that power consumption of the central processing unit can be drastically reduced.

The method for driving the central processing unit includes the following steps (1) to (6). (1) Power supply voltage is supplied to the valid bits 112 using the power controller 104. (2) The arithmetic unit 106 determines which of the plurality of valid bits 112 is valid. (3) Power supply voltage is supplied only to the tag field 110 in the cache line 114 which is determined that the data is valid. (4) The arithmetic unit 106 determines which of the tag fields 110 to which power supply voltage is supplied stores data necessary for the arithmetic unit 106. (5) Power supply voltage is supplied only to the data field 108 in the cache line 114 including the tag field 110. (6) The arithmetic unit 106 reads out the data from the data field 108 to which power supply voltage is supplied.

Embodiment 2

In this embodiment, a method for driving the central processing unit 100 described in Embodiment 1, which is different from the method in Embodiment 1, and an advantage of using the driving method are described with reference to FIGS. 4A and 4B.

The driving method to be described in this embodiment can be performed using a structure that is basically the same as that of the central processing unit described in Embodiment 1; however, control operation of the power controller is partly different.

As shown in FIG. 3A, the power controller 104 described in Embodiment 1 performs control operation in which after power supply voltage is supplied to the valid bits 112, the supply of power supply voltage to all the valid bits 112 is kept.

Further, as shown in FIG. 3B, the power controller 104 performs the control operation in which after power supply voltage is supplied to selected tag fields 110, the supply of power supply voltage to all the selected tag fields 110 is kept.

In the case where the power controller 104 which performs such control operation is used in the central processing unit 100, the power controller 104 only needs to perform the first determination (the determination whether the data stored in the valid bit 112 is valid or invalid), the second determination (the determination whether the address of data required is consistent with the data stored in the tag field), and the supply of power supply voltage based on the determinations, which is effective in the case of reading data from the cache memory 102 at high speed.

On the other hand, this embodiment is effective in reducing power consumption of the central processing unit 100 because it is an object of this embodiment to further reduce power consumption of the central processing unit 100 compared to that in Embodiment 1 by the use of the power controller 104 whose control operation is partly changed.

An example of a method for driving the central processing unit 100 when the power controller 104 whose control operation is partly changed is used is described below with reference to FIGS. 4A and 4B. FIGS. 4A and 4B each show that how the state of power supply changes in the cache memory 102 by performing the driving method described in this embodiment.

The driving method described below mainly describes difference from Embodiment 1; thus, detailed description similar to those in Embodiment 1 is omitted.

Further, in the description of this embodiment, part of the data in the main memory unit 118 is stored in the cache memory 102 similar to the description in Embodiment 1.

First, the first processing is performed as in Embodiment 1, and power supply voltage is supplied to the valid bits 112.

Next, the second processing (the arithmetic unit 106 performs the first determination on the basis of the data stored in the valid bit 112 in each line and outputs a signal for transmitting the result of the determination to the power controller 104) is performed. In the driving method described in this embodiment, the arithmetic unit 106 outputs to the power controller 104 a signal for stopping supply of power to the valid bit 112 in which valid data is not stored (in other words, data "0" is stored) after the end of the first determination or at the time of the first determination in the second processing, so that the power controller 104 which has received the signal stops the supply of power supply voltage to the valid bit 112 in which valid data is not stored (hereinafter, this operation is denoted by seventh processing).

Figure 4A:
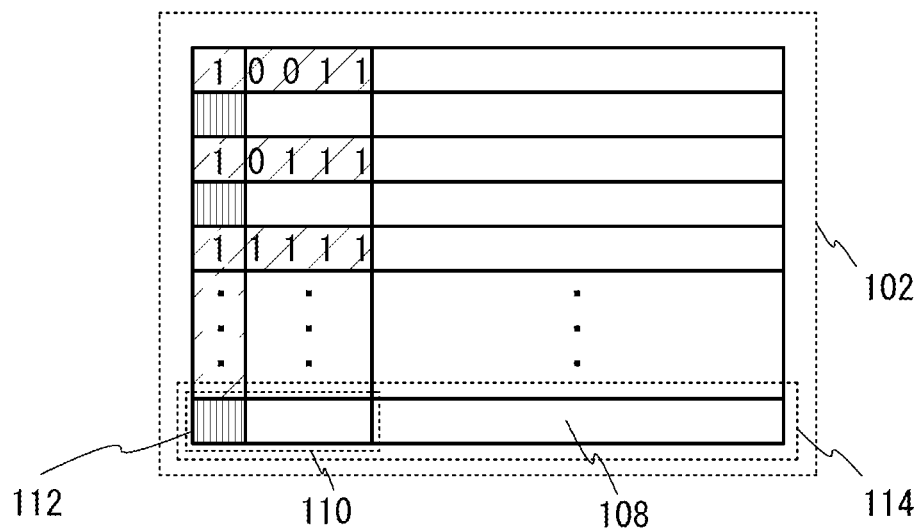
FIGS. 4A and 4B each illustrate an idea of the state of power supply in a cache memory.

By the above processing, in the cache memory 102, power supply voltage is supplied to shaded portions as shown in the state of supply of power supply voltage in FIG. 4A.

In the case of the driving method described in Embodiment 1, power supply voltage is also supplied in vertical line portions in FIG. 4A in addition to the shaded portions in FIG. 4A; however, power supply voltage to the vertical line portion can be stopped by the seventh processing. Thus, power consumption in the central processing unit 100 can be reduced.

Note that the seventh processing is performed between the end of the first determination and before the start of the second determination and is preferably performed after the end of the first determination or at the time of the first determination in the second processing. That is, in order to enhance the effect of reducing power consumption of the central processing unit 100, the supply of power supply voltage to an unnecessary portion (a portion in which valid data is not stored) in the valid bits 112 is preferably stopped before the power supply voltage is supplied to the tag fields 110.

Next, the third processing is performed as in Embodiment 1, and power supply voltage is supplied to the tag field 110 which is in the same line as the valid bit 112 which is determined to be valid in the second processing.

Next, the fourth processing (the arithmetic unit 106 performs the second determination on the basis of the management information stored in the tag field 110 to which power supply voltage is supplied and outputs a signal for transmitting the result of the determination to the power controller 104) is performed. In the driving method described in this embodiment, the arithmetic unit 106 outputs to the power controller 104 a signal for stopping supply of power to tag fields 110 in lines other than the line in which data necessary for the arithmetic unit 106 is stored after the end of the second determination or at the time of the second determination in the fourth processing, so that the power controller 104 which receives the signal stops the supply of power supply voltage to the tag field 110 in the lines in which the data necessary for the arithmetic unit 106 is not stored (hereinafter also denoted by eighth processing).

Figure 4B:
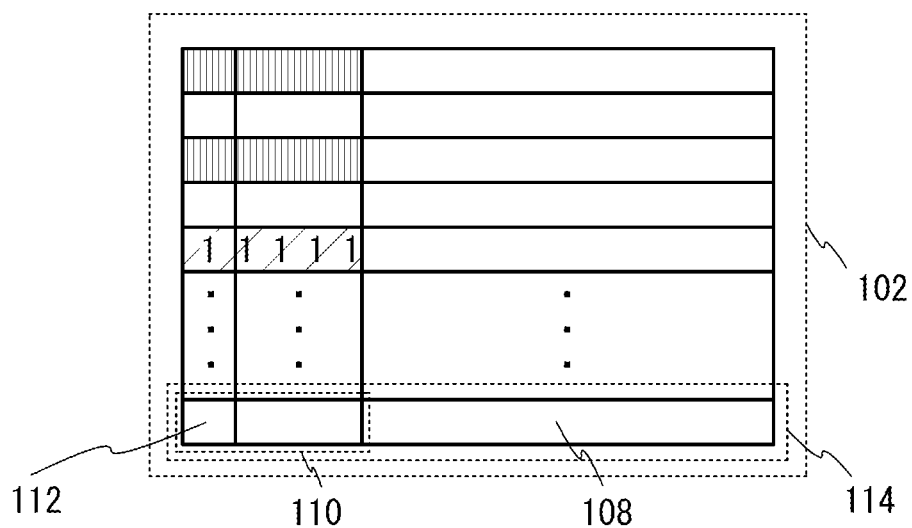

By the above processing, in the cache memory 102, power supply voltage is supplied to shaded portions as shown in the state of supply of power supply voltage in FIG. 4B.

In the case of the driving method described in Embodiment 1, power supply voltage is also supplied to vertical line portions in FIG. 4B in addition to the shaded portions in FIG. 4B; however, power supply voltage to the vertical line portions can be stopped by the eighth processing. Thus, power consumption of the central processing unit 100 can be reduced.

The eighth processing is performed between the end of the second determination and before the sixth processing and is preferably performed after the end of the second determination or at the time of the second determination which is performed in the fourth processing. That is, in order to enhance the effect of reducing power consumption of the central processing unit 100, the supply of power supply voltage to unnecessary portions in the tag field 110 (the tag field 110 in lines other than the line in which data necessary for the arithmetic unit 106 is stored) is preferably stopped before the data stored in the data field 108 is read out.

After that, as in Embodiment 1, after the fifth processing and the sixth processing are performed, supply of power to the cache memory 102 is stopped. Since non-volatile memory cells are used for the memory cells provided for the cache memory 102, data can be held even after the supply of power supply voltage is stopped.

The above is the description of the method for driving the central processing unit in this embodiment.

In this embodiment, in order to enhance the effect of reducing power consumption of the central processing unit 100, the driving method including both the seventh processing and the eighth processing is illustrated; however, it is not necessary to perform both the seventh processing and the eighth processing, and either of them may be performed. Whether either one or both the seventh processing and the eighth processing are performed is determined as appropriate by a practitioner in consideration of power consumption and operation speed which are required for the central processing unit 100.

Effect of Embodiment 2

As described above, the central processing unit is driven by the above-described driving method with the use of the power controller 104 in which the seventh processing and the eight processing are performed as control operation, so that power consumption can be suppressed.

Embodiment 3

In this embodiment, a configuration of a memory cell with nonvolatile properties, in which an OS transistor is used for part of the component, which is described in Embodiment 1 is described.

Figure 5A:
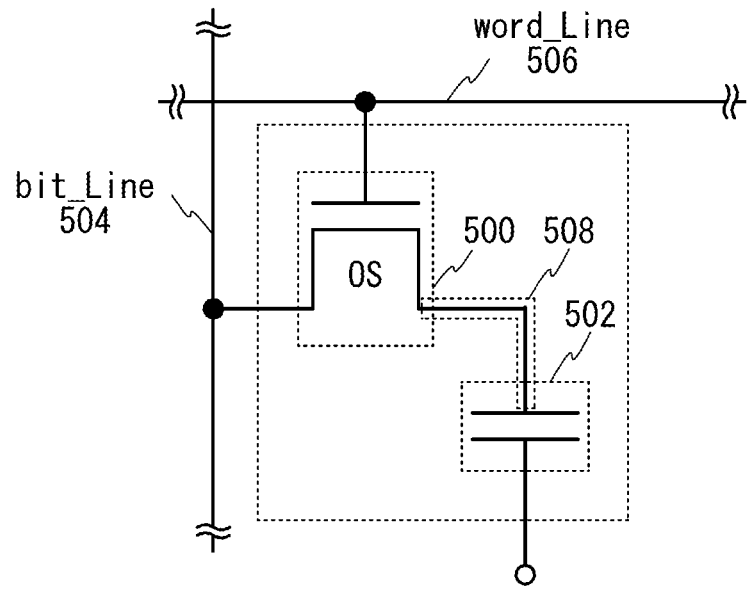
FIGS. 5A and 5B each illustrate an example of a configuration of a nonvolatile memory cell.
Figure 5B:
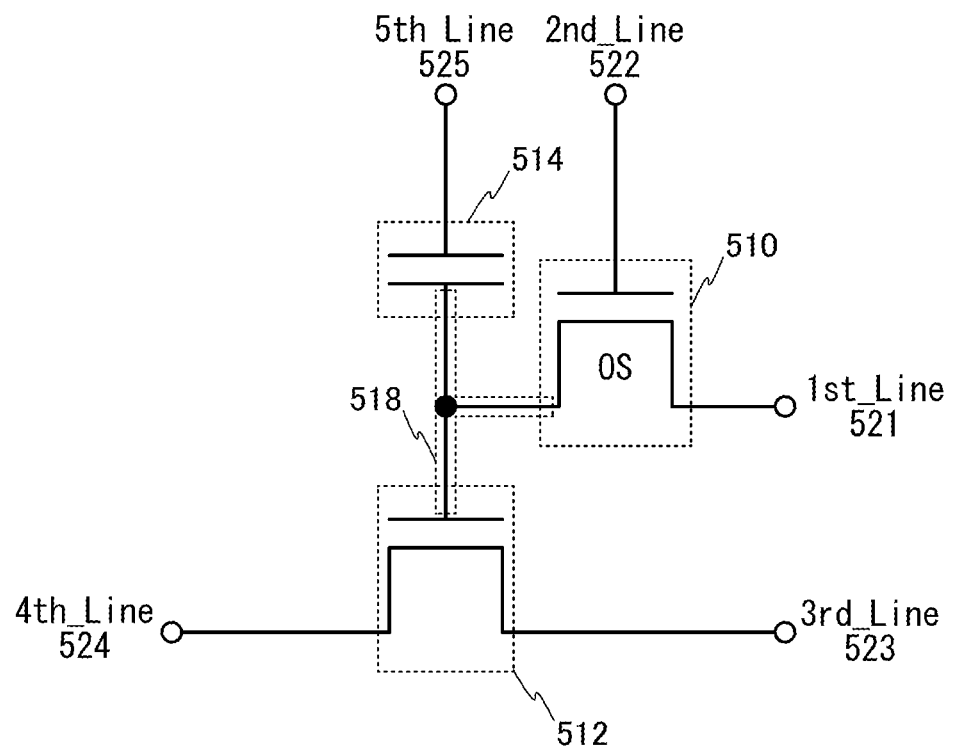

As a memory cell with nonvolatile properties, examples of structures shown in FIGS. 5A and 5B can be given.

FIG. 5A is an example of a structure of a memory cell with nonvolatile properties, and a transistor 500 and a capacitor 502 are connected in series. The structure itself is generally used in a DRAM and the like; however, an OS transistor is used as the transistor 500. One of a source and a drain of the transistor 500 is connected to a bit line 504, and a gate of the transistor 500 is connected to a word line 506. Further, one of electrodes of the capacitor 502 is connected to the other of the source and the drain of the transistor 500, and the other electrode of the capacitor 502 is connected to a fixed potential (e.g., a ground potential).

The energy gap of a semiconductor layer that is used for the transistor 500 and is formed using an oxide semiconductor material is greater than or equal to 3.0 eV, which is much larger than the band gap of silicon (1.1 eV).

The off-resistance of the transistor (resistance between source and drain when the transistor is in an off-state) is inversely proportional to the concentration of carriers thermally excited in the semiconductor layer where a channel is formed. Since the band gap of silicon is 1.1 eV even in a state where there is no carrier caused by a donor or an acceptor (i.e., even in the case of an intrinsic semiconductor), the concentration of thermally excited carriers at room temperature (200 K) is approximately $1 \times 10^{11}$ cm$^{-3}$.

On the other hand, in the case of a semiconductor whose band gap is 3.2 eV (an oxide semiconductor, here), the concentration of thermally excited carriers is approximately $1 \times 10^{-7}$ cm$^{-3}$. When the electron mobility is the same, the resistivity is inversely proportional to the carrier concentration, and thus the resistivity of the semiconductor having a band gap of 3.2 eV is higher by 18 digits than that of silicon.

Such a transistor in which an oxide semiconductor material having a wide band gap is used for a semiconductor layer (OS transistor) can realize an extremely small off-state current.

Accordingly, an OS transistor is used for the transistor 500 connected to the capacitor 502 as illustrated in FIG. 5A (such a transistor can also be referred to as a transistor which controls input/output of a signal to/from the capacitor); the transistor 500 is turned on in accordance with a signal from the word line 506; and the transistor 500 is turned off in accordance with the signal from the word line 506 while a signal from the bit line 504 is supplied to the one of the electrodes of the capacitor 502. In this manner, a signal input through the bit line 504 can be stored in a region (which corresponds to a node 508 in FIG. 5A) between the other of the source and the drain of the transistor 500 and the one of the electrodes of the capacitor 502 for a long time even when power is not supplied to the memory cell (writing).

After that, the transistor 500 is turned on in accordance with the signal from the word line 506, so that data stored in the node 508 can be read out (reading). Note that in the case where the signal read from the memory cell is small, a signal amplifier such as a sense amplifier may be provided in the output path as necessary.

FIG. 5B is an example of a structure of a memory cell with nonvolatile properties. The memory cell described includes a first transistor 510, a second transistor 512, and a capacitor 514, in which one of a source and a drain of the first transistor 510 is connected to a first line 521 (1st line), a gate of the first transistor 510 is connected to a second line 522 (2nd line), one of a source and a drain of the second transistor 512 is connected to a third line 523 (3rd line), and the other of the source and the drain of the second transistor 512 is connected to a fourth line 524 (4th line). Further, one of electrodes of the capacitor 514 is connected to the other of the source and the drain of the first transistor 510 and a gate of the second transistor 512, and the other of the electrodes of the capacitor 514 is connected to a fifth line 525 (5th line).

As shown in FIG. 5B, the first transistor 510 is an OS transistor; therefore, the first transistor 510 is turned on in accordance with a signal from the second line 522, and the first transistor 510 is turned off in accordance with the signal from the second line 522 while a signal from the first line 521 is supplied to the gate of the second transistor 512 and the one of the electrodes of the capacitor 514. In this manner, a signal input through the first line 521 can be stored in a region (which corresponds to a node 518 in FIG. 5B) among the other of the source and the drain of the first transistor 510, the gate of the second transistor 512, and one of the electrodes of the capacitor 514 for a long time even when power is not supplied to the memory cell (writing).

For data reading, an appropriate potential (a reading potential) is applied to the fifth line 525 while a predetermined potential (a constant potential) is supplied to the third line 523 first, whereby the potential of the fourth line 524 varies depending on the amount of charge stored in the node 518. This is because in general, when the second transistor 512 is an n-channel transistor, an apparent threshold voltage $V_{th\_H}$ in the case where High level charge is given to the gate electrode of the second transistor 512 is lower than an apparent threshold voltage $V_{th\_L}$ in the case where Low level charge is given to the gate electrode of the second transistor 512. Here, the apparent threshold voltage refers to the potential of the fifth line 525, which is needed to turn on the second transistor 512. Thus, by setting the potential of the fifth line 525 to a potential $V_0$ which is between $V_{th\_H}$ and $V_{th\_L}$, charge given to the gate of the second transistor 512 can be determined. For example, in the case where a High-level charge is given in writing, when the potential of the fifth line 525 is set to $V_0$ (>$V_{th\_H}$), the second transistor 512 is turned on. In the case where a Low-level charge is given in writing, even when the potential of the fifth line 525 is set to $V_0$ (<$V_{th\_L}$), the second transistor 512 remains in an off state. Therefore, the stored data can be read out by checking the potential of the fourth line 524.

Note that in the case where memory cells are arrayed to be used, it is necessary that only data of desired memory cells can be read. In the case where such reading is not performed, a potential at which the second transistor 512 is turned off, that is, a potential smaller than $V_{th\_H}$ may be given to the fifth line 525 regardless of the state of the gate of the second transistor 512. Alternatively, a potential at which the second transistor 512 is turned on, that is, a potential higher than $V_{th\_L}$ may be given to the fifth line 525 regardless of the state of the gate of the second transistor 512.

The transistor 500 and the first transistor 510, which are OS transistors, can be formed using the same apparatus and method as those of a thin film transistor using silicon or the like; therefore, there is an advantage that it can reduce the load of new capital investment or a study of the manufacturing method. Further, the OS transistor and a transistor including a material other than an oxide semiconductor as a semiconductor layer (e.g., a transistor including single crystal silicon as a semiconductor layer) can be stacked.

Figure 6A:
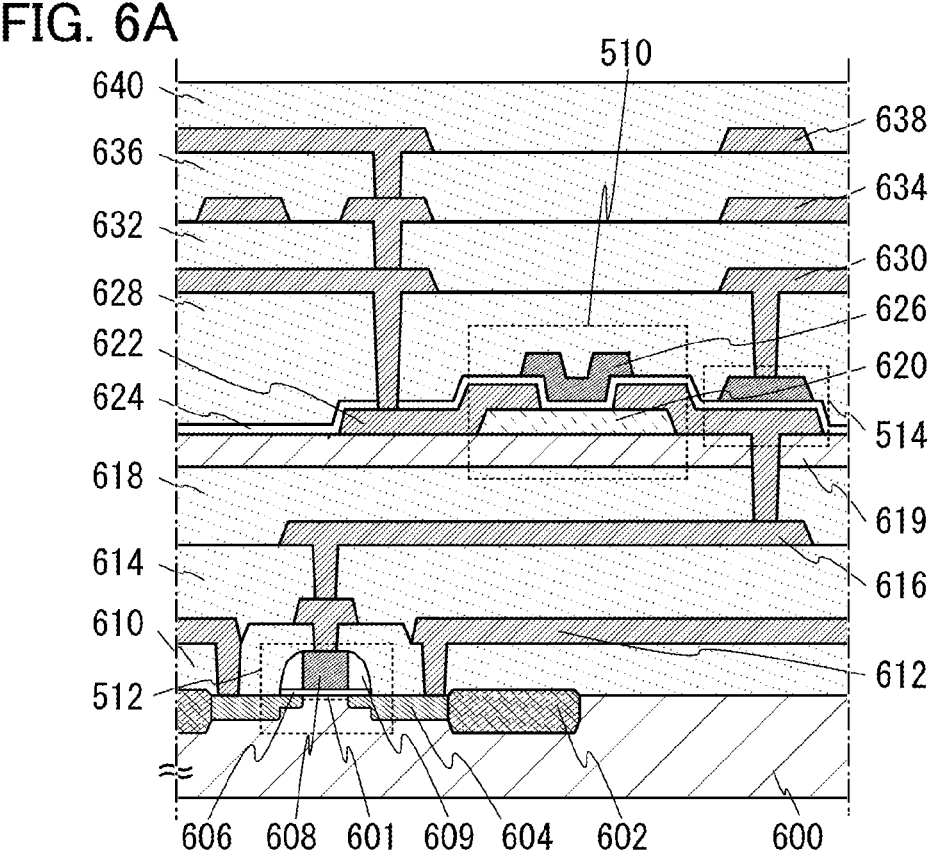
FIGS. 6A to 6C each illustrate an example of a structure of a nonvolatile memory cell.
Figure 6B:
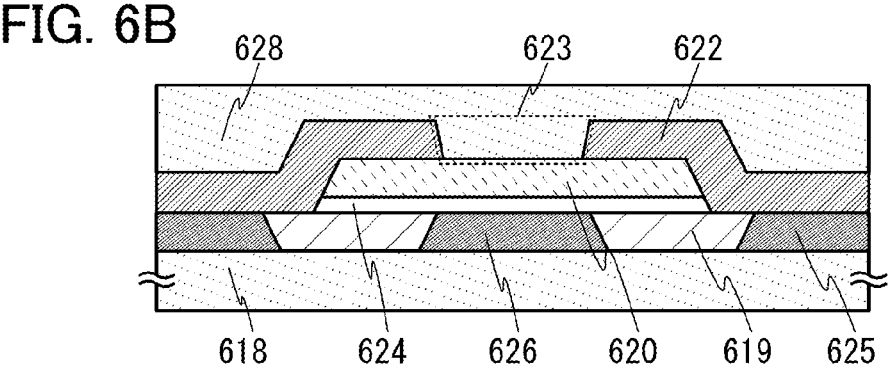
Figure 6C:
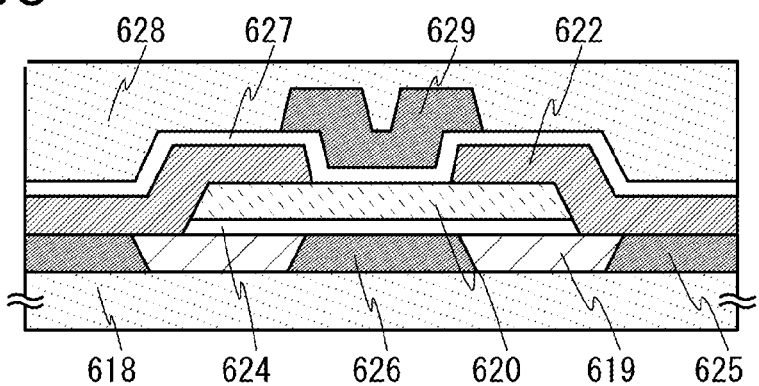
Figure 7A:
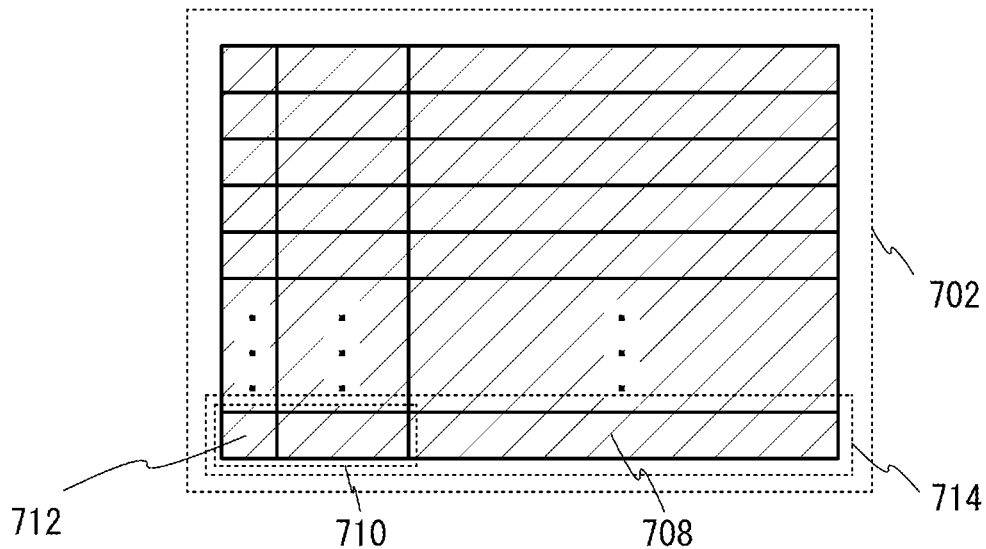
FIGS. 7A and 7B each illustrate an idea of the state of power supply in a cache memory.
Figure 7B:
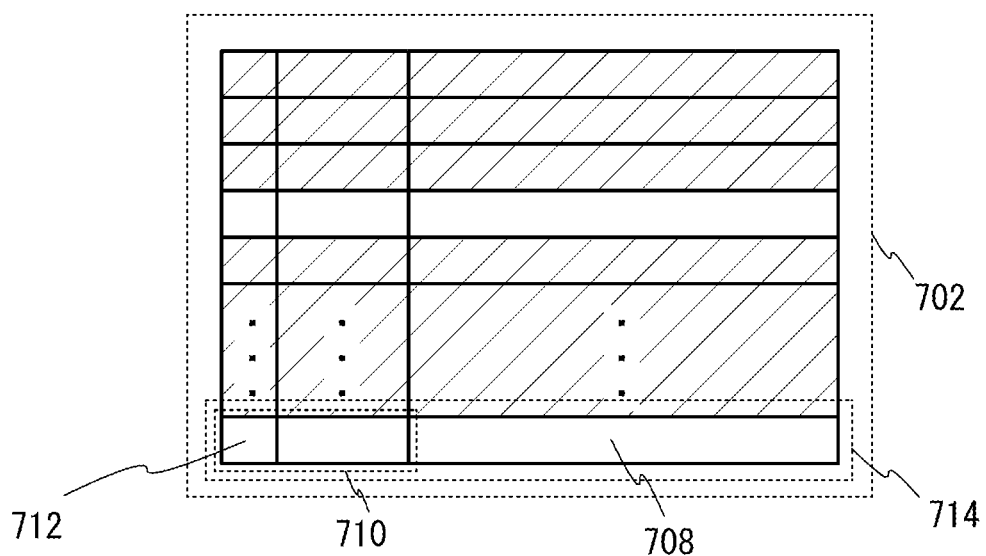
Figure 8A:
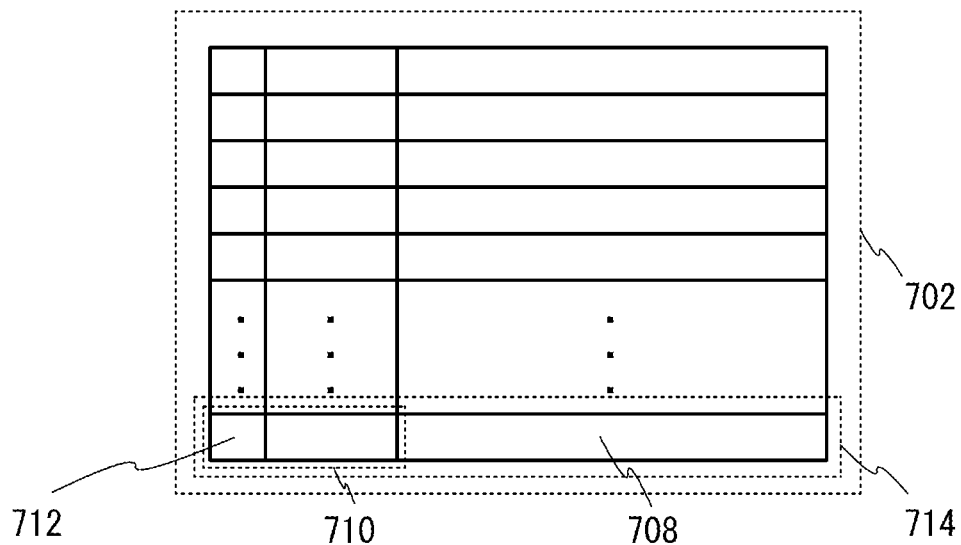
FIGS. 8A and 8B each illustrate an idea of the state of power supply in a cache memory.
Figure 8B:
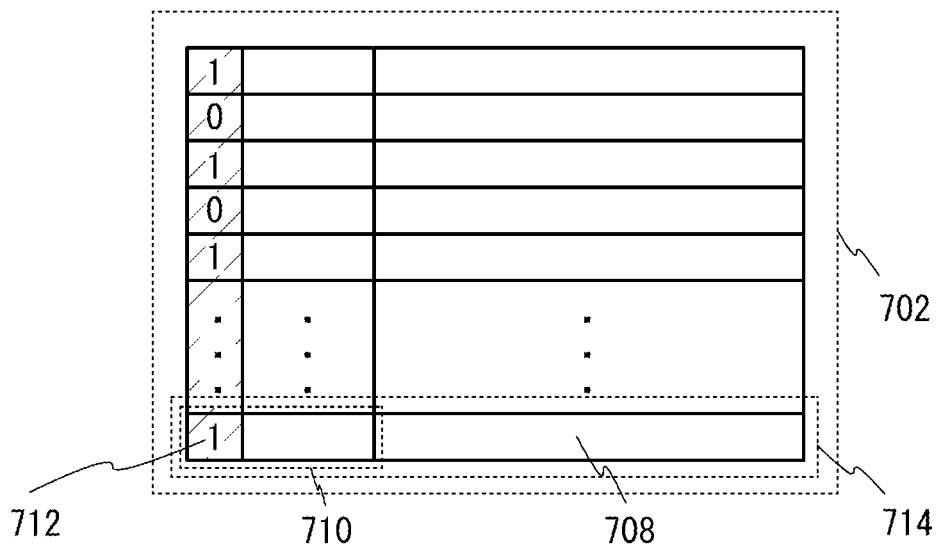

Here, FIGS. 6A to 6C illustrate an example of cross-sectional views of a memory cell in which an OS transistor and a transistor in which single crystal silicon is used for an active layer are stacked as the first transistor 510 and the second transistor 512 which are illustrated in the circuit configuration in FIG. 5B, respectively.

In the memory cell in FIGS. 6A to 6C, the second transistor 512 is formed on a single crystal silicon substrate 600, and the first transistor 510 is formed over the second transistor.

The second transistor 512 includes low-resistance regions 604 which are provided in the single crystal silicon substrate 600 and function as a source and a drain; a channel formation region 601 which is located in the single crystal silicon substrate 600 and between the low-resistance regions 604; a gate insulating film 606 over the channel formation region 601; and a gate electrode 608 provided over the channel formation region 601 with the gate insulating film 606 interposed therebetween.

The second transistor 512 is separated from another transistor by a separation layer 602 that is provided in the single crystal silicon substrate 600. The low-resistance regions 604 of the second transistor 512 are electrically connected to respective conductive films 612 provided over an interlayer film 610 which covers the second transistor 512. Further, the gate electrode 608 is provided with a sidewall insulating film 609 that covers a side surface of the gate electrode 608.

Materials and formation methods for the separation layer 602, the low-resistance regions 604, the gate insulating film 606, the gate electrode 608, the sidewall insulating film 609, the interlayer film 610, and the conductive film 612 are not particularly limited, and known techniques can be used.

The first transistor 510 includes an oxide semiconductor film 620 provided over an insulating film 619, a conductive film 622 electrically connected to the oxide semiconductor film 620 and serving as the a source or the drain of the first transistor 510, a gate insulating film 624 provided over the oxide semiconductor film 620, and a gate electrode 626 provided over the oxide semiconductor film 620 with the gate insulating film 624 interposed therebetween.

As the insulating film 619, with the use of a physical vapor deposition (PVD) method such as a sputtering method, a vacuum evaporation method, or a sputtering method, or a chemical vapor deposition (CVD) method such as a plasma CVD method, a film deposited using an inorganic insulating film using silicon oxide, silicon nitride, silicon nitride oxide, silicon oxynitride, aluminum oxide, aluminum nitride, aluminum nitride oxide, or the like can be used.

Note that a film from which oxygen is released by heat treatment is preferably used as the insulating film 619. The reason thereof is as follows: when oxygen vacancy exists in a channel formation region of the first transistor 510, electric charge is generated due to the oxygen vacancy in some cases. In general, part of oxygen vacancy in an oxide semiconductor film serves as a donor to release an electron which is a carrier. As a result, the threshold voltage of the transistor shifts in the negative direction.

When the insulating film 619 is a film from which oxygen is released by heat treatment, part of oxygen in the oxygen supply film can be released by the heat treatment; therefore, the oxygen can be supplied to the oxide semiconductor film and oxygen vacancy in the oxide semiconductor film can be filled, which can suppress the shift of the threshold voltage of the transistor in the negative direction. In particular, the oxygen supply film preferably contains oxygen which exceeds at least the stoichiometric composition. For example, in the case where silicon oxide is used for the oxygen supply film, a film of silicon oxide represented by $SiO_{2+\alpha}$ ($\alpha>0$) is preferably used. Note that a region containing a larger amount of oxygen than the stoichiometric composition (hereinafter referred to as "an oxygen-excessive region" in some cases) may exist in at least part of the oxygen supply film.

Note that the "film from which oxygen is released by heat treatment" described above refers to a film in which the amount of oxygen which is released when heated to 520° C. and which is converted to oxygen atoms is greater than or equal to $1.0 \times 10^{19}$ atoms/cm$^2$, preferably greater than or equal to $3.0 \times 10^{19}$ atoms/cm$^2$, further preferably greater than or equal to $1.0 \times 10^{20}$ atoms/cm$^2$, still further preferably greater than or equal to $3.0 \times 10^{20}$ atoms/cm$^2$.

Here, a method in which the amount of released oxygen is measured using TDS analysis will now be described.

The amount of released gas in the TDS analysis is proportional to an area of a peak originating from ions of the gas. Therefore, the amount of the released gas can be calculated from the ratio between the peak area of a sample and that of a standard sample. The peak area of the standard sample refers to the ratio of the density of an atom contained in a sample to the area of the peak originating from the ions of the released gas.

For example, the amount of the released oxygen molecules ($N_{O2}$) from an insulating film can be obtained according to Formula 1 with the TDS analysis results of a silicon wafer containing hydrogen at a known density which is the standard sample and the TDS analysis results of the insulating film which is the measurement sample. Here, all ions having a mass-to-charge ratio (M/z) of 32 which are detected by the TDS analysis are assumed to originate from an oxygen molecule. Although $CH_3OH$ can also be given as a molecule having M/z of 32, it is not taken into consideration on the assumption that it is unlikely to be present. Further, oxygen molecules including an isotope of an oxygen atom having M/z of 17 or 18 which is an isotope of an oxygen atom are also not taken into consideration because the proportion of such molecules in the natural world is minimal

[FORMULA 1]

$$N_{O2} = \frac{N_{H2}}{S_{H2}} \times S_{O2} \times \alpha \quad (1)$$

A value obtained by conversion of the amount of hydrogen molecules desorbed from the standard sample into densities is denoted by $N_{H2}$. The peak area of the hydrogen ion detected in the case of the standard sample is denoted by $S_{H2}$. Here, $N_{H2}/S_{H2}$ is a reference value of the standard sample. The peak area of the oxygen ion detected in the case of the insulating film is denoted by $S_{O2}$. $\alpha$ is a coefficient which influences spectrum intensity in the TDS analysis. Refer to Japanese Published Patent Application No. H06-275697 for details of the Formula 1. Note that the measurement can be carried out with a thermal desorption spectroscopy apparatus produced by ESCO Ltd., EMD-WA1000S/W using a silicon wafer containing hydrogen atoms at $1 \times 10^{16}$ atoms/cm$^2$ as the standard sample, for example.

In the TDS analysis, oxygen is partly detected as an oxygen atom. The ratio between oxygen molecules and oxygen atoms can be calculated from the ionization rate of the oxygen molecules. Since the constant $\alpha$ includes the ionization rate of the oxygen molecules, the amount of the released oxygen atoms can also be estimated from the amount of the released oxygen molecules.

Note that $N_{O2}$ is the amount of the released oxygen molecules. The amount of released oxygen when converted into oxygen atoms is twice the number of the released oxygen molecules.

For the introduction of oxygen into the oxide semiconductor layer, heat treatment performed under an oxygen atmosphere, an ion implantation method, an ion doping method, a plasma immersion ion implantation method, plasma treatment performed under an atmosphere containing oxygen, or the like can be employed.

Further, in the case where the hydrogen concentration in an insulating film containing excess oxygen is greater than or equal to $7.2 \times 10^{20}$ atoms/cm$^3$, variation in initial characteristics of the transistor is increased, an L length dependence of electrical characteristics of the transistor is increased, and the transistor is significantly degraded by external stress; therefore, the hydrogen concentration in the insulating film containing excess oxygen is preferably controlled to be less than $7.2 \times 10^{20}$ atoms/cm$^3$. In other words, the hydrogen concentration in the oxide semiconductor film is preferably less than or equal to $5 \times 10^{19}$ atoms/cm$^3$, and the hydrogen concentration in the insulating film containing excess oxygen is preferably less than $7.2 \times 10^{20}$ atoms/cm$^3$. A method for forming a film having a low hydrogen concentration will be described in detail later.

Note that in the case where oxygen is supplied from the oxygen supply film to the oxide semiconductor film by heat treatment, it is preferable that a film having a low oxygen or water vapor permeability (also referred to as a low moisture permeability) be formed under the oxygen supply film (that is, to a surface of the oxygen supply film opposite to the surface in contact with the oxide semiconductor film) so that oxygen released from the oxygen supply film can be supplied to the oxide semiconductor film efficiently. For example, under the oxygen supply film, an aluminum oxide film, an aluminum oxynitride film, an aluminum nitride oxide film, or the like may be formed as a barrier film. In the case of using an aluminum oxide film, the aluminum oxide film preferably has a high density (film density of higher than or equal to 3.2 g/cm$^3$, preferably higher than or equal to 3.6 g/cm$^3$).

An oxide semiconductor material used for the oxide semiconductor film 620 contains at least indium (In). In particular, In and zinc (Zn) are preferably contained. In addition, as a stabilizer for reducing the variation in electric characteristics of a transistor using the oxide, the oxide semiconductor preferably contains gallium (Ga) in addition to In and Zn. Tin (Sn) is preferably contained as a stabilizer. Hafnium (Hf) is preferably contained as a stabilizer. Aluminum (Al) is preferably contained as a stabilizer. Zirconium (Zr) is preferably contained as a stabilizer.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

As the oxide semiconductor, for example, any of the following can be used: indium oxide; tin oxide; zinc oxide; a two-component metal oxide such as an In—Zn-based oxide, an In—Mg-based oxide, or an In—Ga-based oxide; a three-component metal oxide such as an In—Ga—Zn-based oxide (also referred to as IGZO), an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; or a four-component metal oxide such as an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Note that here, for example, an "In—Ga—Zn-based oxide" means an oxide containing In, Ga, and Zn as its main components and there is no particular limitation on the ratio of In, Ga, and Zn. The In—Ga—Zn-based oxide may contain a metal element other than the In, Ga, and Zn.

Alternatively, a material represented by $InMO_3(ZnO)_m$ (m>0 is satisfied, and m is not an integer) may be used as an oxide semiconductor. Note that M represents one or more metal elements selected from Ga, Fe, Mn, and Co. Alternatively, as the oxide semiconductor, a material expressed by a chemical formula, $In_2SnO_5(ZnO)_n$ (n>0, n is a natural number) may be used.

A structure of the oxide semiconductor film will be described below.

An oxide semiconductor film is classified roughly into a single-crystal oxide semiconductor film and a non-single-crystal oxide semiconductor film. The non-single-crystal oxide semiconductor film includes any of an amorphous oxide semiconductor film, a microcrystalline oxide semiconductor film, a polycrystalline oxide semiconductor film, a c-axis aligned crystalline oxide semiconductor (CAAC-OS) film, and the like.

The amorphous oxide semiconductor film has disordered atomic arrangement and no crystalline component. A typical example thereof is an oxide semiconductor film in which no crystal part exists even in a microscopic region, and the whole of the film is amorphous.

The microcrystalline oxide semiconductor film includes a microcrystal (also referred to as nanocrystal) with a size greater than or equal to 1 nm and less than 10 nm, for example. Thus, the microcrystalline oxide semiconductor film has a higher degree of atomic order than the amorphous oxide semiconductor film. Hence, the density of defect states of the microcrystalline oxide semiconductor film is lower than that of the amorphous oxide semiconductor film.

The CAAC-OS film is one of oxide semiconductor films including a plurality of crystal parts, and most of the crystal parts each fit inside a cube whose one side is less than 100 nm. Thus, there is a case where a crystal part included in the CAAC-OS film fits inside a cube whose one side is less than 10 nm, less than 5 nm, or less than 3 nm. The density of defect states of the CAAC-OS film is lower than that of the microcrystalline oxide semiconductor film. The CAAC-OS film is described in detail below.

In a transmission electron microscope (TEM) image of the CAAC-OS film, a boundary between crystal parts, that is, a grain boundary is not clearly observed. Thus, in the CAAC-OS film, a reduction in electron mobility due to the grain boundary is less likely to occur.

According to the TEM image of the CAAC-OS film observed in a direction parallel to a sample surface (cross-sectional TEM image), metal atoms are arranged in a layered manner in the crystal parts. Each metal atom layer has a shape reflected by a surface over which the CAAC-OS film is formed (hereinafter, a surface over which the CAAC-OS film is formed is referred to as a formation surface) or a projection or a depression of a top surface of the CAAC-OS film, and is arranged in parallel to the formation surface or the top surface of the CAAC-OS film.

On the other hand, according to the TEM image of the CAAC-OS film observed in a direction substantially perpendicular to the sample surface (plan TEM image), metal atoms are arranged in a triangular or hexagonal configuration in the crystal parts. However, there is no regularity of arrangement of metal atoms between different crystal parts.

From the results of the cross-sectional TEM image and the plan TEM image, alignment is found in the crystal parts in the CAAC-OS film.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is derived from the (009) plane of the $InGaZnO_4$ crystal, which indicates that crystals in the CAAC-OS film have c-axis alignment, and that the c-axes are aligned in a direction perpendicular to the formation surface or the top surface of the CAAC-OS film.

On the other hand, when the CAAC-OS film is analyzed by an in-plane method in which an X-ray enters a sample in a direction perpendicular to the c-axis, a peak appears frequently when 2θ is around 56°. This peak is derived from the (110) plane of the $InGaZnO_4$ crystal. Here, analysis (φ scan) is performed under conditions where the sample is rotated around a normal vector of a sample surface as an axis (φ axis) with 2θ fixed at around 56°. In the case where the sample is a single-crystal oxide semiconductor film of $InGaZnO_4$, six peaks appear. The six peaks are derived from crystal planes equivalent to the (110) plane. On the other hand, in the case of a CAAC-OS film, a peak is not clearly observed even when 0 scan is performed with 2θ fixed at around 56°.

According to the above results, in the CAAC-OS film having c-axis alignment, while the directions of a-axes and b-axes are different between crystal parts, the c-axes are aligned in a direction parallel to a normal vector of a formation surface or a normal vector of a top surface. Thus, each metal atom layer arranged in a layered manner observed in the cross-sectional TEM image corresponds to a plane parallel to the a-b plane of the crystal.

Note that the crystal part is formed concurrently with deposition of the CAAC-OS film or is formed through crystallization treatment such as heat treatment. As described above, the c-axis of the crystal is aligned in a direction parallel to a normal vector of a formation surface or a normal vector of a top surface. Thus, for example, in the case where a shape of the CAAC-OS film is changed by etching or the like, the c-axis might not be necessarily parallel to a normal vector of a formation surface or a normal vector of a top surface of the CAAC-OS film.

Further, the degree of crystallinity in the CAAC-OS film is not necessarily uniform. For example, in the case where crystal growth leading to the CAAC-OS film occurs from the vicinity of the top surface of the film, the degree of the crystallinity in the vicinity of the top surface is higher than that in the vicinity of the formation surface in some cases. Further, when an impurity is added to the CAAC-OS film, the crystallinity in a region to which the impurity is added is changed, and the degree of crystallinity in the CAAC-OS film varies depending on regions.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ do not appear at around 36°.

In a transistor using the CAAC-OS film, change in electric characteristics due to irradiation with visible light or ultraviolet light is small. Thus, the transistor has high reliability.

Note that an oxide semiconductor film may be a stacked film including two or more films of an amorphous oxide semiconductor film, a microcrystalline oxide semiconductor film, and a CAAC-OS film, for example.

In this specification, a term "parallel" indicates that the angle formed between two straight lines is greater than or equal to −10° and less than or equal to 10°, and accordingly also includes the case where the angle is greater than or equal to −5° and less than or equal to 5°. In addition, a term "perpendicular" indicates that the angle formed between two straight lines is greater than or equal to 80° and less than or equal to 100°, and accordingly includes the case where the angle is greater than or equal to 85° and less than or equal to 95°.

For the deposition of the CAAC-OS film, the following conditions are preferably used.

By reducing the amount of impurities entering the CAAC-OS film during the deposition, the crystal state can be prevented from being broken by the impurities. For example, the concentration of impurities (e.g., hydrogen, water, carbon dioxide, or nitrogen) which exist in the deposition chamber may be reduced. Specifically, a deposition gas with a dew point of −80° C. or lower, preferably −100° C. or lower, more preferably −120° C. or lower is used.

By increasing the substrate heating temperature during the deposition, migration of a sputtered particle is likely to occur after the sputtered particle is attached to a substrate surface. Specifically, the substrate heating temperature during the deposition is higher than or equal to 100° C. and lower than or equal to 740° C., preferably higher than or equal to 200° C. and lower than or equal to 500° C. By increasing the substrate heating temperature during the deposition, when the flat-plate-like sputtered particle reaches the substrate, migration occurs on the substrate surface, so that a flat plane of the flat-plate-like sputtered particle is attached to the substrate.

Furthermore, it is preferable that the proportion of oxygen in the deposition gas be increased and the power be optimized in order to reduce plasma damage at the deposition. The proportion of oxygen in the deposition gas is 30 vol % or higher, preferably 100 vol %. By increasing the proportion of oxygen contained in the deposition gas, a CAAC-OS film is more likely to be formed because an unnecessary atom such as a rare gas does not enter the film As an example of the sputtering target, an In—Ga—Zn—O compound target is described below.

The In—Ga—Zn—O compound target, which is polycrystalline, is made by mixing $InO_X$ powder, $GaO_Y$ powder, and $ZnO_Z$ powder in a predetermined molar ratio, applying pressure, and performing heat treatment at a temperature higher than or equal to 1000° C. and lower than or equal to 1500° C. Note that X, Y, and Z are each a given positive number. Here, the predetermined molar ratio of $InO_X$ powder to $GaO_Y$ powder and $ZnO_Z$ powder is, for example, 2:2:1, 8:4:3, 3:1:1, 1:1:1, 4:2:3, or 3:1:2. The kinds of powder and the molar ratio for mixing powder may be determined as appropriate depending on the desired sputtering target.

Note that since oxygen vacancy in the oxide semiconductor film 620 is preferably reduced as much as possible, it is preferable that the oxide semiconductor film used for formation of the oxide semiconductor film 620 be deposited with a deposition atmosphere in which an oxygen gas accounts for a large proportion; therefore, it can be said that it is preferable to use a sputtering apparatus into which oxygen can be introduced and in which the gas flow rate can be adjusted. Further, 90% or more of the gas introduced into a deposition chamber of the sputtering apparatus is an oxygen gas, and in the case where another gas is used in addition to the oxygen gas, a rare gas is preferably used. Further, it is more preferable that the gas introduced into the deposition chamber be only an oxygen gas and the percentage of an oxygen gas in the deposition atmosphere be as closer to 100% as possible.

Further, when the oxide semiconductor film 620 contains a large amount of hydrogen, the hydrogen and an oxide semiconductor are bonded to each other, so that part of the hydrogen serves as a donor and causes generation of an electron which is a carrier. As a result, the threshold voltage of the transistor shifts in the negative direction. Accordingly, the hydrogen concentration in the oxide semiconductor film 620 is preferably lower than $5 \times 10^{18}$ atoms/cm$^3$, more preferably lower than or equal to $1 \times 10^{18}$ atoms/cm$^3$, still more preferably lower than or equal to $5 \times 10^{17}$ atoms/cm$^3$, further more preferably lower than or equal to $1 \times 10^{16}$ atoms/cm$^3$. Note that the concentration of hydrogen in the oxide semiconductor film 620 is measured by secondary ion mass spectrometry (SIMS).

For the above-described reason, it is preferable that the gas used for deposition of the oxide semiconductor film 620 does not contain an impurity such as water, hydrogen, a hydroxyl group, or hydride. Further, it is preferable to use a gas having a purity greater than or equal to 6N, preferably greater than or equal to 7N (i.e., the impurity concentration in the gas is less than or equal to 1 ppm, preferably less than or equal to 0.1 ppm).

Further, in deposition of the oxide semiconductor film 620, in order to remove moisture (including water, water vapor, hydrogen, a hydroxyl group, or hydroxide) in the deposition chamber, an entrapment vacuum pump such as a cryopump, an ion pump, or a titanium sublimation pump is preferably used. The evacuation unit may be a turbo molecular pump provided with a cold trap. From the deposition chamber which is evacuated with a cryopump, a hydrogen atom, a compound containing a hydrogen atom such as water ($H_2O$) (preferably, also a compound containing a carbon atom), and the like are removed, whereby the concentration of impurities such as hydrogen or moisture in the oxide semiconductor film 620 formed in the deposition chamber can be reduced.

Note that the oxide semiconductor film 620 may have a structure in which a plurality of oxide semiconductor films are stacked. For example, the oxide semiconductor film 620 may be a stack of the first oxide semiconductor film, the second oxide semiconductor film, and the third oxide semiconductor film, which each have a different composition. For example, the first oxide semiconductor film and the third oxide semiconductor film may be formed using a three-component metal oxide, and the second oxide semiconductor film may be formed using a two-component metal oxide. In the case where the materials containing the same components are used, the second oxide semiconductor film can be formed over the first oxide semiconductor film using a crystal layer of the first oxide semiconductor film as a seed; therefore, crystal growth of the second oxide semiconductor film can be easily caused. The same applies to the third oxide semiconductor film. In addition, in the case where the materials including the same components are used, an interface property such as adhesion or electric characteristics is good.

Further, the constituent elements of the first oxide semiconductor film, the second oxide semiconductor film, and the third oxide semiconductor film may be the same and the compositions of the constituent elements of the first oxide semiconductor film, the second oxide semiconductor film, and the third oxide semiconductor film may be different. For example, the first oxide semiconductor film and the third oxide semiconductor film may have an atomic ratio of In:Ga:Zn=1:1:1, and the second oxide semiconductor film may have an atomic ratio of In:Ga:Zn=3:1:2. Alternatively, the first oxide semiconductor film and the third oxide semiconductor film may each have an atomic ratio of In:Ga:Zn=1:3:2, and the second oxide semiconductor film may have an atomic ratio of In:Ga:Zn=3:1:2.

At this time, the second oxide semiconductor film preferably contains more In than Ga. Further, the first oxide semiconductor film and the third oxide semiconductor film preferably contain In and Ga at a proportion of In≤Ga.

In an oxide semiconductor, the s orbital of heavy metal mainly contributes to carrier transfer, and when the In content in the oxide semiconductor is increased, overlap of the s orbitals is likely to be increased. Therefore, an oxide having a composition of In>Ga has higher mobility than an oxide having a composition of In≤Ga. Further, in Ga, the formation energy of oxygen vacancy is larger and thus oxygen vacancy is less likely to occur, than in In; therefore, the oxide having a composition of In≤Ga has more stable characteristics than the oxide having a composition of In>Ga.

An oxide semiconductor having a composition of In>Ga is applied to the second oxide semiconductor film which is not in contact with the insulating film 619 or the gate insulating film 624, and an oxide semiconductor having a composition of In≤Ga is applied to the first oxide semiconductor film or the third oxide semiconductor film which is in contact with the insulating film 619 or the gate insulating film 624, whereby mobility and reliability of a transistor can be increased.

Note that when the film (the insulating film 619, the gate insulating film 624, or the like in the drawing) which is in contact with and is different from the oxide semiconductor film is formed, an impurity might be diffused into the oxide semiconductor film from the film formed to be in contact with the oxide semiconductor film. For example, when silicon, carbon, or the like contained in the insulating film 619 or the gate insulating film 624 is diffused into the oxide semiconductor film, electrical characteristics of the transistor may be adversely affected.

However, the oxide semiconductor film having higher mobility described above (that is, a portion mainly serving as a carrier path of the oxide semiconductor film) is provided away from the film (the insulating film 619, the gate insulating film 624, or the like in the drawing) which is in contact with the oxide semiconductor film, whereby an adverse effect on electrical characteristics of the transistor due to impurity diffusion can be suppressed.

Note that after a film for forming the oxide semiconductor film 620 is deposited or after the oxide semiconductor film 620 is formed, "dehydration treatment (dehydrogenation treatment)" and "peroxide treatment" described below may be performed on the oxide semiconductor film. Needless to say, when the transistor using the oxide semiconductor film 620 as the active layer has favorable electrical characteristics, the treatment is not necessarily performed.

<Description of Dehydration Treatment (Dehydrogenation Treatment)>

As dehydration treatment (dehydrogenation treatment), a substrate may be heated at a temperature of higher than or equal to 300° C. and lower than or equal to 700° C., or lower than the strain point of the substrate. The heat treatment is performed, whereby excess hydrogen (including water and a hydroxyl group) can be removed.

As a heat treatment apparatus, it is possible to use an electric furnace or an apparatus for heating an object to be processed using thermal conduction or thermal radiation generated from a medium such as a heated gas. For example, a rapid thermal annealing (RTA) apparatus such as a gas rapid thermal annealing (GRTA) apparatus or a lamp rapid thermal annealing (LRTA) apparatus can be used. An LRTA apparatus is an apparatus for heating an object to be processed by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for performing heat treatment using a high-temperature gas. As the gas, an inert gas which does not react with an object to be processed by heat treatment, such as nitrogen or a rare gas such as argon is used.

For example, as the heat treatment, GRTA treatment may be performed as follows. An object to be processed is put in an inert gas atmosphere that has been heated, heated for several minutes, and taken out from the inert gas atmosphere. The GRTA process enables high-temperature heat treatment for a short time. Moreover, the GRTA process can be employed even when the temperature exceeds the upper temperature limit of the object. Note that the inert gas may be switched to a gas including oxygen during the process.

Note that as the inert gas atmosphere, an atmosphere that contains nitrogen or a rare gas (e.g., helium, neon, or argon) as its main component and does not contain water, hydrogen, or the like is preferably used. For example, the purity of nitrogen or a rare gas such as helium, neon, or argon introduced into a heat treatment apparatus is greater than or equal to 6 N (99.9999%), preferably greater than or equal to 7 N (99.99999%) (that is, the concentration of the impurities is less than or equal to 1 ppm, preferably less than or equal to 0.1 ppm).

<Description of Peroxide Treatment>

The dehydration or dehydrogenation treatment may be accompanied by elimination of oxygen which is a main constituent material for an oxide semiconductor film to lead to a reduction in oxygen. Therefore, in the case where the dehydration or dehydrogenation treatment is performed, oxygen is preferably supplied to the oxide semiconductor film.

The oxygen vacancy in the oxide semiconductor film may be filled in the following manner for example: after the oxide semiconductor film is subjected to the dehydration treatment (the dehydrogenation treatment), a high-purity oxygen gas, a dinitrogen monoxide gas, a high-purity nitrous oxide gas, or ultra dry air (the moisture amount is less than or equal to 20 ppm (−55° C. by conversion into a dew point), preferably less than or equal to 1 ppm, more preferably less than or equal to 10 ppb, in the measurement with the use of a dew point meter of a cavity ring down laser spectroscopy (CRDS) system) may be introduced into the same furnace. It is preferable that water, hydrogen, or the like be not contained in the oxygen gas or the dinitrogen monoxide gas. Alternatively, the purity of the oxygen gas or the dinitrogen monoxide gas which is introduced into the heat treatment apparatus is preferably 6N or higher, further preferably 7N or higher (i.e., the impurity concentration in the oxygen gas or the dinitrogen monoxide gas is preferably 1 ppm or lower, further preferably 0.1 ppm or lower). Note that the pressure in the apparatus is set to be high in the heat treatment, whereby oxygen can be efficiently added to the oxide semiconductor film.

Alternatively, the oxygen vacancy in the oxide semiconductor film can be filled in the following manner for example: oxygen (including at least one of an oxygen radical, an oxygen atom, and an oxygen ion) is added to the oxide semiconductor film by an ion implantation method, an ion doping method, a plasma immersion ion implantation method, plasma treatment, or the like.

As described above, the deposited oxide semiconductor film is subjected to the dehydration treatment (the dehydrogenation treatment), whereby hydrogen or moisture is removed from the oxide semiconductor so that the oxide semiconductor is purified so as to contain impurities as little as possible. Then, oxygen that is a main component material of the oxide semiconductor, which is reduced through the dehydration treatment (the dehydrogenation treatment), is supplied (also referred to peroxide treatment), whereby the oxygen vacancy can be filled.

The conductive film 622 may be formed of a film including an element selected from tantalum (Ta), tungsten (W), titanium (Ti), molybdenum (Mo), aluminum (Al), copper (Cu), chromium (Cr), and neodymium (Nd); or an alloy material or compound material mainly containing any of the elements by a physical vapor deposition (PVD) method such as a vacuum evaporation method or a sputtering method, or a chemical vapor deposition (CVD) method such as a plasma CVD method. Further, as a conductive film, a semiconductor film typified by a polycrystalline silicon film doped with an impurity element such as phosphorus or an AgPdCu alloy film may be used.

Note that when a metal film (that is, the conductive film 622) in contact with the oxide semiconductor film 620 is formed using a metal with high oxygen affinity, oxygen is easily extracted from the oxide semiconductor film 620; thus, the oxide semiconductor film 620 may have a change in its composition.

Therefore, the conductive film 622 in contact with the oxide semiconductor film 620 is preferably formed using a metal with low oxygen affinity. For example, a tungsten film, a titanium film, or a molybdenum film can be used. In the case where the conductive film 622 has a stacked-layer structure, for at least a layer of the conductive film 622 in contact with the oxide semiconductor film 620, a metal with low oxygen affinity is preferably used, and for the other layers, the above material, for example, a low-resistance conductive material such as aluminum or copper, is preferably used.

The gate insulating film 624 may be formed using a method and a material similar to those of the insulating film 619 and is preferably a film from which oxygen is released by heat treatment as well as the insulating film 619.

The gate electrode 626 may be formed using a method and a material similar to those of the conductive film 622.

Note that at least a film of the gate electrode 626 in contact with the gate insulating film 624 is preferably a film of a material having a work function higher than that of a material of the oxide semiconductor film 620. As the film, a metal oxide film containing nitrogen such as an In—Ga—Zn—O film containing nitrogen, an In—Sn—O film containing nitrogen, an In—Ga—O film containing nitrogen, an In—Zn—O film containing nitrogen, a Sn—O film containing nitrogen, an In—O film containing nitrogen, or a metal nitride (e.g., InN or SnN) film or the like can be used. These films each have a work function higher than or equal to 5 eV (electron volts), preferably higher than or equal to 5.5 eV (electron volts); thus, when these are used for the gate electrode, the threshold voltage of the transistor can be positive. Accordingly, what is called a normally-off switching element (in this embodiment, the first transistor 510 corresponds to the normally-off switching element) can be provided.

Note that as shown in FIG. 6A, a plurality of interlayer films (interlayer films 614 and 618 in the drawing) or a conductive film (a conductive films 616 in the drawing) may be formed between the layer where the second transistor 512 is formed and the layer where the first transistor 510 is formed.

The interlayer film 614, the interlayer film 618, and the conductive film 616 may be formed using a known method and a known material, which are generally used as an interlayer film or a conductive film. Note that the first transistor 510 is formed over the interlayer film 618; therefore, it is preferable that the interlayer film 618 be subjected to planarization treatment (e.g., CMP treatment) after the interlayer film 618 is formed, whereby the planarity of the surface of the interlayer film 618 is improved.

An OS transistor can be formed so that a plurality of layers or a plurality of conductive films is interposed between the OS transistor and another transistor; therefore, the degree of flexibility in the circuit configuration can be increased.

Further, as shown in FIG. 6A, a plurality of interlayer films (interlayer films 628, 632, 636, and 640 in the drawings) or a plurality of conductive films (conductive films 630, 634, and 638 in the drawings) may be formed over the first transistor 510.

The interlayer films 628, 632, 636, and 640 and the conductive films 630, 634, and 638 may be formed using a known method and a known material, which are generally used as an interlayer film or a conductive film.

The OS transistor can be formed using the plurality of layers or the plurality of conductive film as an upper layer as described above; therefore, the length in the thickness direction of a through wiring which is used for connection of the OS transistor and another transistor can be reduced. Also in terms of this point, it can be said that the degree of flexibility in the circuit configuration can be increased. Further, it can be said that the through wiring is easily formed.

Note that the first transistor 510 described above includes the conductive film 622 serving as the source or the drain and the gate electrode 626 over the oxide semiconductor film 620, which is what is called a top-gate top-contact (TGTC) structure; however, the structure of the first transistor 510 is not limited to the structure.

For example, the first transistor 510 may have a top-gate bottom-contact (TGBC) structure in which the conductive film 622 serving as the source or the drain is formed under the oxide semiconductor film 620.

Further, as shown in FIG. 6B, the first transistor 510 may include the gate electrode 626 under the oxide semiconductor film 620 with the gate insulating film 624 interposed therebetween, which is a bottom-gate top-contact (BGTC) structure. Further, the first transistor 510 may include the conductive film 622 serving as the source or the drain under the oxide semiconductor film 620 in FIG. 6B, which is a bottom-gate bottom-contact (BGBC) structure.

The conductive film 622 serving as the source or the drain may be directly connected to the conductive film 625 formed of the same material as the gate electrode 626 as shown in FIG. 6B so that leading of the source and the drain is performed using the conductive film 622; alternatively, leading of the source and the drain may be performed using the conductive film 625. In the case where leading is performed using the conductive film 625, leading of a wiring can be performed without drawing the conductive film to the above unlike FIG. 6A (e.g., without drawing the conductive film 622 over the interlayer film 628 using the conductive film 630); thus, the number of masks to be used can be suppressed. In addition, leading of a wiring is performed using both the conductive film 622 and the conductive film 625, so that wiring resistance can be further reduced. As in FIG. 6A, the conductive film 625 is not necessarily formed.

At least a portion of the gate insulating film 624 which is over the conductive film 625 needs to be removed so that the conductive film 622 and the conductive film 625 are directly connected to each other. With this removal, the gate electrode 626 may be exposed (in a state where a film is not formed over the surface of the gate electrode 626). In this case, when the conductive film 622 is formed by etching treatment or the like, a material which is less easily etched than the conductive film 622 is preferably formed over the surface of the gate electrode 626 so that the gate electrode 626 is not etched away.

Furthermore, as shown in FIG. 6C, the first transistor 510 may have a structure where a back gate electrode 629 is formed over the oxide semiconductor film 620 with an insulating film 627 interposed therebetween. With the structure including the back gate electrode 629, even when the first transistor 510 is in a normally-on state (here, the term "normally-on state" means that the transistor is turned on when power supply voltage is not supplied), power supply voltage is supplied to the back gate electrode 629 as appropriate, whereby the threshold voltage of the first transistor 510 can be shifted to keep the first transistor 510 in a normally-off state (here, the term "normally-off state" means that the transistor is turned off when power supply voltage is not supplied).

When the conductive film 622 is formed by processing the conductive film, the distance between the conductive films 622 (which corresponds to a region 623) can be reduced by the use of an electron beam drawing equipment (also referred to as electron beam (EB) lithography system); thus, the first transistor 510 which is reduced in size can be easily formed.

The above is the description of the structure of the memory cell in which an OS transistor is used for a part of the component and which has nonvolatile properties.

Embodiment 4

A central processing unit disclosed in this specification can be applied to a variety of electronic devices (including game machines). Examples of the electronic devices include display devices of televisions, monitors, and the like, lighting devices, desktop information terminals and notebook information terminals, word processors, image reproduction devices which reproduce still images or moving images stored in recording media such as digital versatile discs (DVDs), portable compact disc (CD) players, radio receivers, tape recorders, headphone stereos, stereos, cordless phone handsets, transceivers, portable wireless devices, cellular phones, car phones, portable game machines, calculators, portable information terminals, electronic notebooks, e-book readers, electronic translators, audio input devices, cameras such as video cameras and digital still cameras, electric shavers, high-frequency heating appliances such as microwave ovens, electric rice cookers, electric washing machines, electric vacuum cleaners, air-conditioning systems such as air conditioners, dishwashers, dish dryers, clothes dryers, futon dryers, electric refrigerators, electric freezers, electric refrigerator-freezers, freezers for preserving DNA, smoke detectors, radiation counters, and medical equipment such as dialyzers. Further, the examples include industrial equipment such as guide lights, traffic lights, belt conveyors, elevators, escalators, industrial robots, and power storage systems. In addition, oil engines, moving objects driven by electric motors using power from the non-aqueous secondary batteries, and the like are also included in the category of electronic devices. Examples of the moving objects include electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats or ships, submarines, helicopters, aircrafts, rockets, artificial satellites, space probes, planetary probes, spacecrafts, and the like. Specific examples of these electronic devices are illustrated in FIGS. 9A to 9E.

Figure 9A:
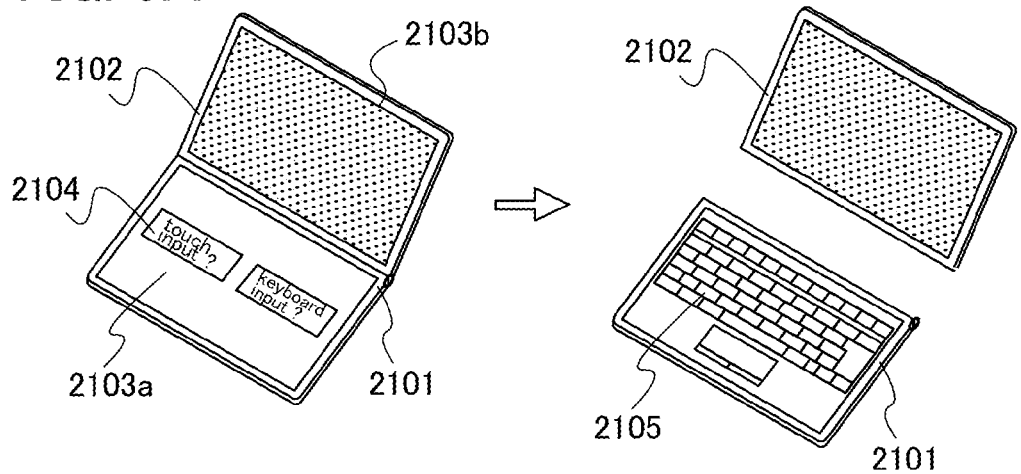
FIGS. 9A to 9E are diagrams illustrating electronic devices each including a central processing unit.

FIG. 9A illustrates a portable information terminal which includes a housing 2101, a housing 2102, a first display portion 2103 a, a second display portion 2103b, and the like. A central processing unit is incorporated as a part in the housing 2101 and the housing 2102. By employing the structure of the central processing unit and the driving method described in any of the above embodiments in the central processing unit, the portable information terminal can achieve low-power consumption.

At least one of the first display portion 2103a and the second display portion 2103b is a touch panel, and for example, as illustrated in the left in FIG. 9A, which of "touch input" and "keyboard input" is performed can be selected by selected buttons 2104 displayed on the first display portion 2103a. Since the selected buttons with a variety of sizes can be displayed, the portable information terminal can be easily used by people of any generation. In the case where "touch input" is selected, for example, a keyboard 2105 is displayed on the first display portion 2103a as illustrated in the right in FIG. 9A. With the keyboard 2105, letters can be input quickly by keyboard input as in the case of using a conventional information terminal, for example.

In the portable information terminal illustrated in FIG. 9A, the housing 2101 provided with the first display portion 2103a and the housing 2102 provided with the second display portion 2103b can be separated as in the right part of FIG. 9A. Thus, the portable information terminal can be used as a lighter portable information terminal by detaching one of the housing 2101 and the housing 2102 as necessary.

The portable information terminal in FIG. 9A can have a function of displaying a variety of data (e.g., a still image, a moving image, and a text image) on the display portion, a function of displaying a calendar, a date, the time, or the like on the display portion, a function of operating or editing data displayed on the display portion, a function of controlling processing by various kinds of software (programs), and the like. Furthermore, an external connection terminal (an earphone terminal, a USB terminal, or the like), a recording medium insertion portion, and the like may be provided on the back surface or the side surface of the housing.

In addition, the portable information terminal illustrated in FIG. 9A may transmit and receive data wirelessly. Through wireless communication, desired book data or the like can be purchased and downloaded from an electronic book server.

Further, the housing 2101 or the housing 2102 illustrated in FIG. 9A may be equipped with an antenna, a microphone function, or a wireless communication function, so that the portable information terminal may be used as a mobile phone.

Figure 9B:
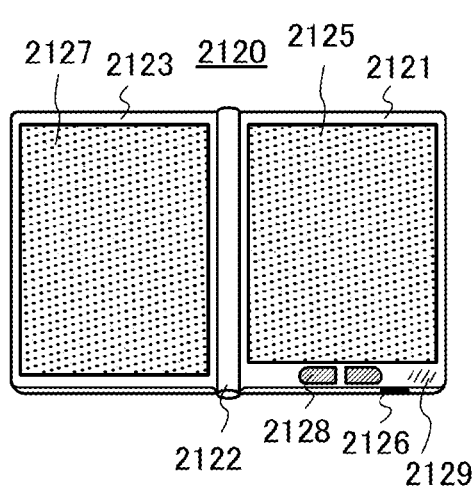

FIG. 9B illustrates an example of an e-book reader. For example, an e-book reader 2120 includes two housings of a housing 2121 and a housing 2123. The housing 2121 and the housing 2123 are combined with a hinge 2122 so that the e-book reader 2120 can be opened and closed with the hinge 2122 as an axis. With such a structure, the e-book reader 2120 can operate like a paper book.

A display portion 2125 and a display portion 2127 are incorporated in the housing 2121 and the housing 2123, respectively. The display portion 2125 and the display portion 2127 may display one image or different images. In the case where the display portion 2125 and the display portion 2127 display different images, for example, text can be displayed on a display portion on the right side (the display portion 2125 in FIG. 9B) and images can be displayed on a display portion on the left side (the display portion 2127 in FIG. 9B).

A central processing unit is incorporated as a part in the housing 2121 and the housing 2123. By employing the structure of the central processing unit and the driving method described in any of the above embodiments in the central processing unit, the e-book reader 2120 can achieve low-power consumption.

FIG. 9B illustrates an example in which the housing 2121 is provided with an operation portion and the like. For example, the housing 2121 is provided with a power switch 2126, an operation key 2128, a speaker 2129, and the like. The page can be turned with the operation key 2128. Note that a keyboard, a pointing device, or the like may also be provided on the surface of the housing, on which the display portion is provided. Furthermore, an external connection terminal (an earphone terminal, a USB terminal, or the like), a recording medium insertion portion, and the like may be provided on the back surface or the side surface of the housing. Further, the e-book reader 2120 may have a function of an electronic dictionary.

The e-book reader 2120 may be configured to transmit and receive data wirelessly. Through wireless communication, desired book data or the like can be purchased and downloaded from an electronic book server.

Figure 9C:
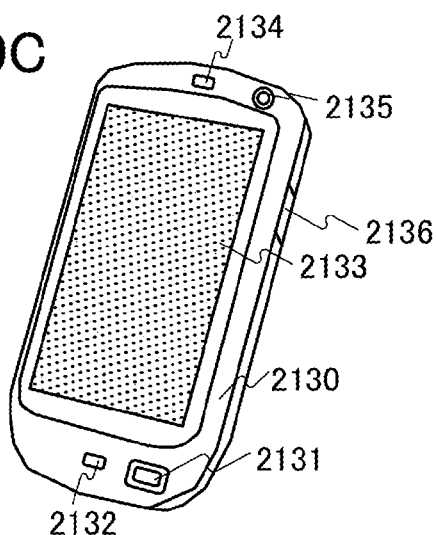

FIG. 9C illustrates a smartphone, which includes a housing 2130, a button 2131, a microphone 2132, a display portion 2133 provided with a touch panel, a speaker 2134, and a camera lens 2135 and functions as a mobile phone.

A central processing unit is incorporated as a part in the housing 2130. By employing the structure of the central processing unit and the driving method described in any of the above embodiments in the central processing unit, the smartphone can achieve low-power consumption.

The display portion 2133 changes the direction of display as appropriate depending on a use mode. Since the camera lens 2135 is provided on the same plane as the display portion 2133, videophone is possible. The speaker 2134 and the microphone 2132 can be used not only for voice calls, but also for video phone calls, recording, playing sound, and the like.

An external connection terminal 2136 can be connected to an AC adapter and various types of cables such as a USB cable, and charging and data communication with an information terminal are possible. Furthermore, a large amount of data can be stored and moved by inserting a storage medium into the external memory slot (not illustrated).

Further, in addition to the above functions, an infrared communication function, a television reception function, or the like may be provided.

Figure 9D:
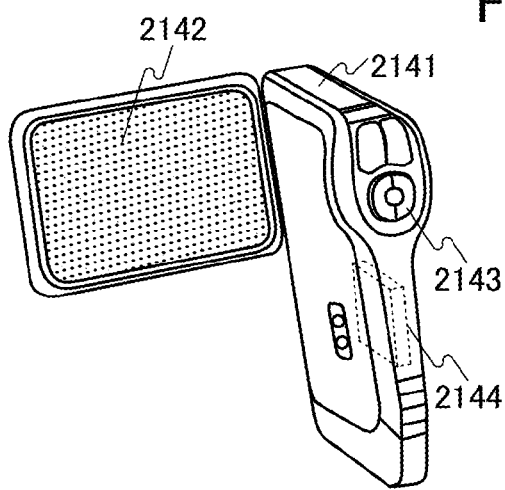

FIG. 9D illustrates a digital video camera which includes a housing 2141, a display portion 2142, an operation switch 2143, a battery 2144, and the like.

A central processing unit is incorporated as a part in the housing 2141. By employing the structure of the central processing unit and the driving method described in any of the above embodiments in the central processing unit, the digital video camera can achieve low-power consumption.

Figure 9E:
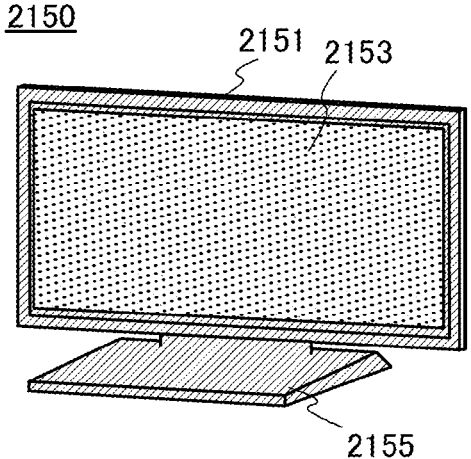

FIG. 9E illustrates an example a television set. In a television set 2150, a display portion 2153 is incorporated in a housing 2151. The display portion 2153 can display images. In this example, the housing 2151 is supported by a stand 2155.

A central processing unit is incorporated as a part in the housing 2151. By employing the structure of the central processing unit and the driving method described in any of the above embodiments in the central processing unit, the television set 2150 can achieve low-power consumption.

The television set 2150 can be operated with an operation switch of the housing 2151 or a separate remote controller. Further, the remote controller may be provided with a display portion for displaying data output from the remote controller.

Note that the television set 2150 is provided with a receiver, a modem, and the like. Moreover, when the display device is connected to a communication network with or without wires via the modem, one-way (from a sender to a receiver) or two-way (between a sender and a receiver or between receivers) information communication can be performed.

This embodiment can be combined with any of the other embodiments as appropriate.

This application is based on Japanese Patent Application serial no. 2012-126064 filed with Japan Patent Office on Jun. 1, 2012, the entire contents of which are hereby incorporated by reference.

What is claimed is:

1. A central processing unit comprising:
   a cache memory comprising a first cache line and a second cache line; and
   a power controller configured to supply power supply voltage to a tag field of the first cache line whose valid bit stores information that data stored in the tag field of the first cache line is valid and not to supply power supply voltage to a tag field of the second cache line whose valid bit stores information that data stored in the tag field of the second cache line is invalid,
   wherein the valid bit of the first cache line, the tag field of the first cache line, the valid bit of the second cache line, and the tag field of the second cache line each comprises a first transistor whose channel formation region comprises an oxide semiconductor.

2. The central processing unit according to claim 1,
   wherein the cache memory further comprises a third cache line whose valid bit stores information that data stored in a tag field of the third cache line is valid, and
   wherein the power controller is configured to supply power supply voltage to a data field of the first cache line whose tag field stores an address of data required by an arithmetic unit and not to supply power supply voltage to a data field of the third cache line whose tag field does not store an address of data required by the arithmetic unit.

3. The central processing unit according to claim 1,
   wherein the valid bit of the first cache line, the tag field of the first cache line, the valid bit of the second cache line, and the tag field of the second cache line each comprises a second transistor whose channel formation region comprises silicon, and
   wherein a gate of the second transistor is electrically connected to a source or drain of the first transistor.

4. The central processing unit according to claim 3,
   wherein an insulating layer is located over the second transistor, and
   wherein the first transistor is located over the insulating layer.

5. The central processing unit according to claim 1,
   wherein the valid bit of the first cache line, the tag field of the first cache line, the valid bit of the second cache line, and the tag field of the second cache line each comprises a capacitor electrically connected to a source or drain of the first transistor.

6. The central processing unit according to claim 1,
   wherein an insulating layer is in contact with the channel formation region, the insulating layer being capable of supplying oxygen to the channel formation region.

7. The central processing unit according to claim 1, wherein the first transistor comprises:
   a conductive layer over and electrically connected to the channel formation region; and
   a gate electrode over the channel formation region.

8. The central processing unit according to claim 1, wherein the channel formation region comprises indium, gallium, zinc, and oxygen.

9. A central processing unit comprising:
   a cache memory comprising a plurality of cache lines each including a data field configured to store part of data in a main memory unit, a tag field configured to store management information on data stored in the data field, and a valid bit configured to store information of whether the data stored in the data field is valid or invalid and whether the management information stored in the tag field is valid or invalid;
   a power controller configured to determine whether power supply voltage is supplied to the data field or not, whether power supply voltage is supplied to the tag field or not, and whether power supply voltage is supplied to the valid bit or not; and
   an arithmetic unit configured to make a first determination in which whether the data stored in the valid bit is valid or invalid is determined and a second determination in which whether an address of data required corresponds to data stored in the tag field or not, and output a result of the first determination and a result of the second determination to the power controller,
   wherein the data field, the tag field, and the valid bit each comprises a memory cell capable of holding written data or written information even when power supply voltage is not supplied, and
   wherein when data transmission and reception between the arithmetic unit and the cache memory is not performed, the power controller is configured to stop supply of power supply voltage to the data field, the tag field, and the valid bit; and when data transmission and reception between the arithmetic unit and the cache memory is performed, the power controller is configured to perform supply of power supply voltage to the valid bit, to the tag field in the cache line which is determined that the data stored in the valid bit is valid by the first determination, and to the data field in the cache line which is determined that the address of data required corresponds to the data stored in the tag field by the second determination.

10. The central processing unit according to claim 9, wherein the power controller is configured to stop supply of power supply voltage to the valid bit after making the first determination or at the time of making the first determination.

11. The central processing unit according to claim 9, wherein the power controller is configured to stop supply of power supply voltage to the tag field after making the second determination or at the time of making the second determination.

12. A method for driving a central processing unit,
   wherein the central processing unit comprises:
   a cache memory comprising a plurality of cache lines each including a data field configured to store part of data in a main memory unit, a tag field configured to store management information on data stored in the data field, and a valid bit configured to store information of whether the data stored in the data field is valid or invalid and whether the management information stored in the tag field is valid or invalid;
   a power controller configured to determine whether power supply voltage is supplied to the data field or not, whether power supply voltage is supplied to the tag field or not, and whether power supply voltage is supplied to the valid bit or not; and
   an arithmetic unit configured to make a first determination in which whether the data stored in the valid bit is valid or invalid is determined and a second determination in which whether an address of data required corresponds to data stored in the tag field or not, and output a result of the first determination and a result of the second determination to the power controller,
   wherein the data field, the tag field, and the valid bit each comprises a memory cell capable of holding written data or written information even when power supply voltage is not supplied,
   the method comprising:
   by the power controller, stopping supply of power supply voltage to the data field, the tag field, and the valid bit when data transmission and reception between the arithmetic unit and the cache memory is not performed; and
   performing first to sixth processings when reading data stored in the cache memory by the arithmetic unit,
   wherein by the power controller, supplying power supply voltage to the valid bit, in first processing,
   wherein by the arithmetic unit, making the first determination and outputting the result of the first determination to the power controller, in second processing,
   wherein by the power controller, supplying power supply voltage to the tag field in the cache line which is determined to be valid in the second processing, in third processing,
   wherein by the arithmetic unit, making the second determination and outputting the result of the second determination to the power controller, in fourth processing,
   wherein by the power controller, supplying power supply voltage to the data field in the cache line which is determined to be corresponding, in fifth processing, and
   wherein by the arithmetic unit, reading the data in the data field to which power supply voltage is supplied in the fourth processing, in sixth processing.

13. The method for driving a central processing unit according to claim 12, wherein the power controller is configured to stop supply of power supply voltage to the valid bit after making the first determination or at the time of making the first determination.

14. The method for driving a central processing unit according to claim 12, wherein the power controller is configured to stop supply of power supply voltage to the tag field after making the second determination or at the time of making the second determination.

* * * * *